United States Patent
Gutierrez et al.

(10) Patent No.: US 12,494,927 B2
(45) Date of Patent: Dec. 9, 2025

(54) SCHEDULED-BASED LOW-LATENCY DETECTION FOR DESYNCHRONIZATION ATTACKS

(71) Applicant: Intel Corporation, Santa Clara, CA (US)

(72) Inventors: Christopher Gutierrez, Hillsboro, OR (US); Marcio Juliato, Portland, OR (US); Manoj Sastry, Portland, OR (US); Vuk Lesi, Cornelius, OR (US); Shabbir Ahmed, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 18/215,951

(22) Filed: Jun. 29, 2023

(65) Prior Publication Data

US 2025/0007738 A1    Jan. 2, 2025

(51) Int. Cl.
*H04L 9/40*  (2022.01)
*H04L 9/32*  (2006.01)
*H04W 4/70*  (2018.01)
*H04W 12/06*  (2021.01)

(52) U.S. Cl.
CPC .............. *H04L 9/40* (2022.05); *H04L 9/3242* (2013.01); *H04L 9/3297* (2013.01); *H04W 4/70* (2018.02); *H04W 12/06* (2013.01)

(58) Field of Classification Search
CPC ............ H04L 9/40; H04W 12/06; H04W 4/70
See application file for complete search history.

(56) References Cited

U.S. PATENT DOCUMENTS

| 10,063,374 B2 * | 8/2018 | Bamasag | H04W 4/70 |
| 2003/0067921 A1 * | 4/2003 | Sivalingham | H04W 12/06 370/394 |
| 2023/0008404 A1 * | 1/2023 | Celiesius | H04L 9/40 |

* cited by examiner

*Primary Examiner* — Barbara B Anyan
(74) *Attorney, Agent, or Firm* — KDW FIRM PLLC

(57) ABSTRACT

Techniques include a method, apparatus, system and computer-readable medium to detect, quantify and localize attacks to enhance security for time-synchronized networking. Embodiments include a diagnostic stream producer to produce diagnostic information providing evidence of a timing attack on a node of a time-synchronized network. Embodiments include a diagnostic stream consumer to consume diagnostic information, analyze the diagnostic information, and determine whether a node is under a timing attack. Other embodiments are described and claimed.

14 Claims, 17 Drawing Sheets

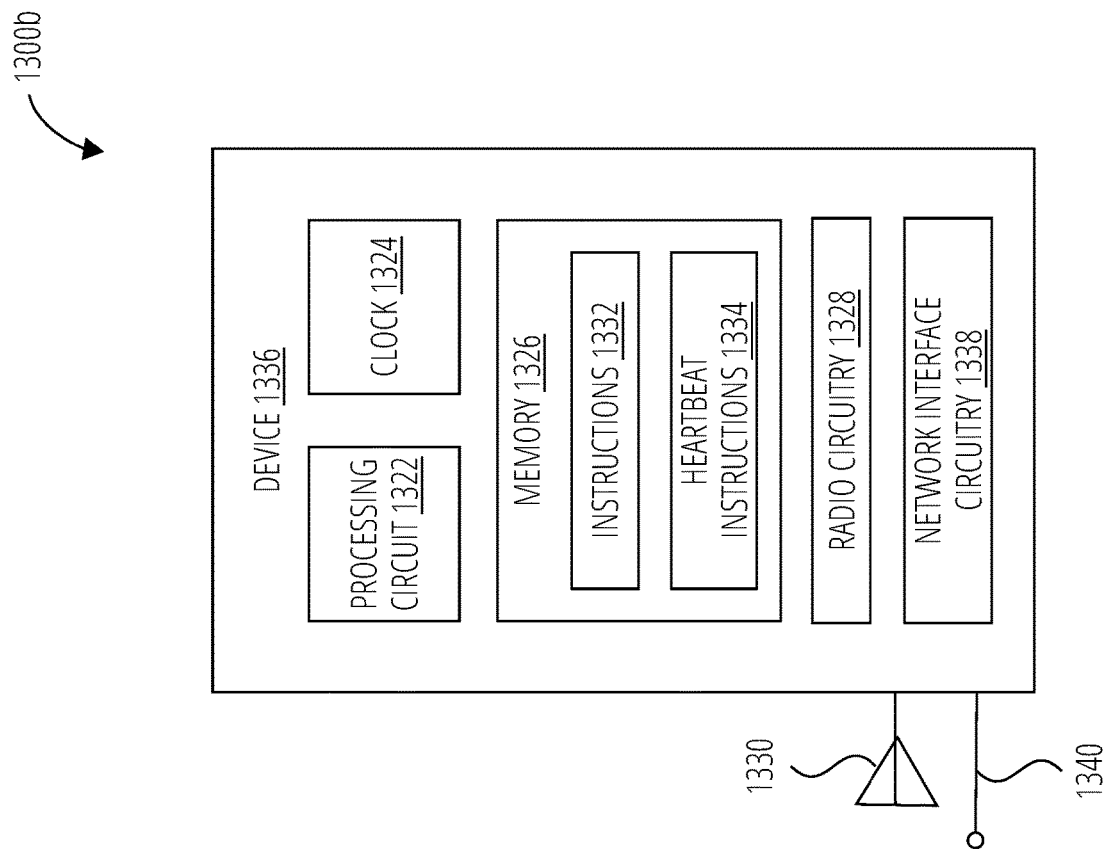
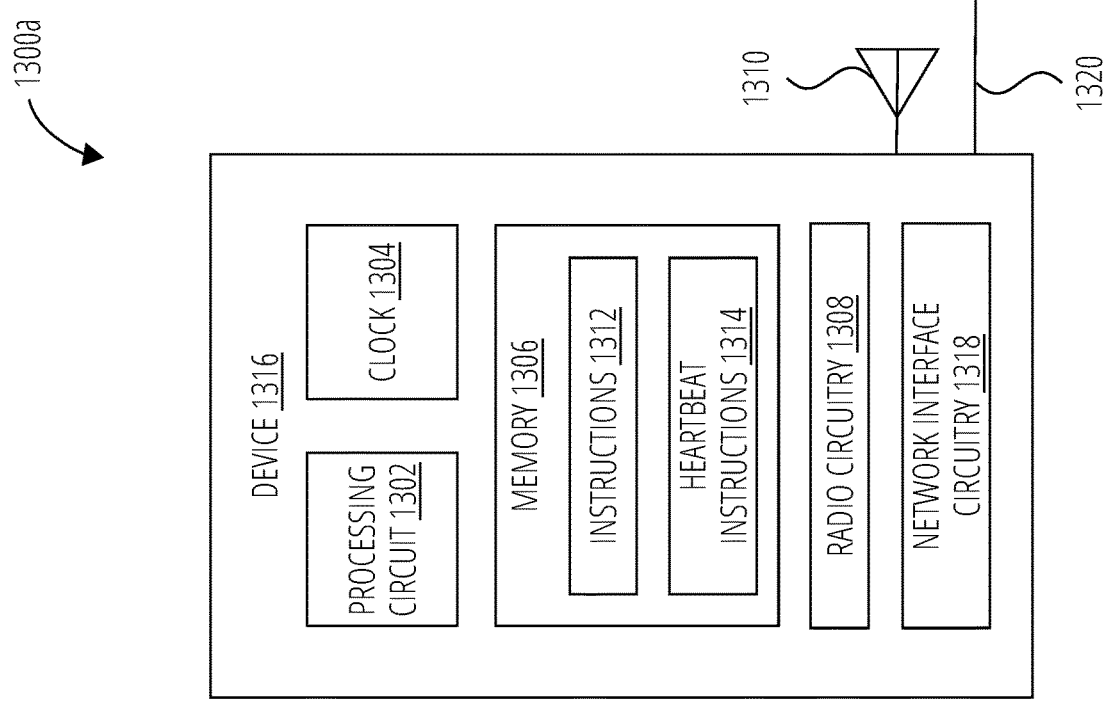
FIG. 13A
FIG. 13B

SCHEDULED-BASED LOW-LATENCY DETECTION FOR DESYNCHRONIZATION ATTACKS

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-synchronized networking.

In general, time-synchronized networking or time-sensitive networking defines a set of standards (and amendments) with the aim to enable time synchronization and deterministic data delivery in converged networks where time-critical (TC) traffic coexists with other types of traffic. Thus, there is a need to provide security for time-synchronized network devices to mitigate the risks associated with disruption in time-synchronized network operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 13A illustrates an aspect of a TSN node 1300a in accordance with one embodiment.

FIG. 13B illustrates an aspect of a TSN node 1300b in accordance with one embodiment.

DETAILED DESCRIPTION

Figure 1A:
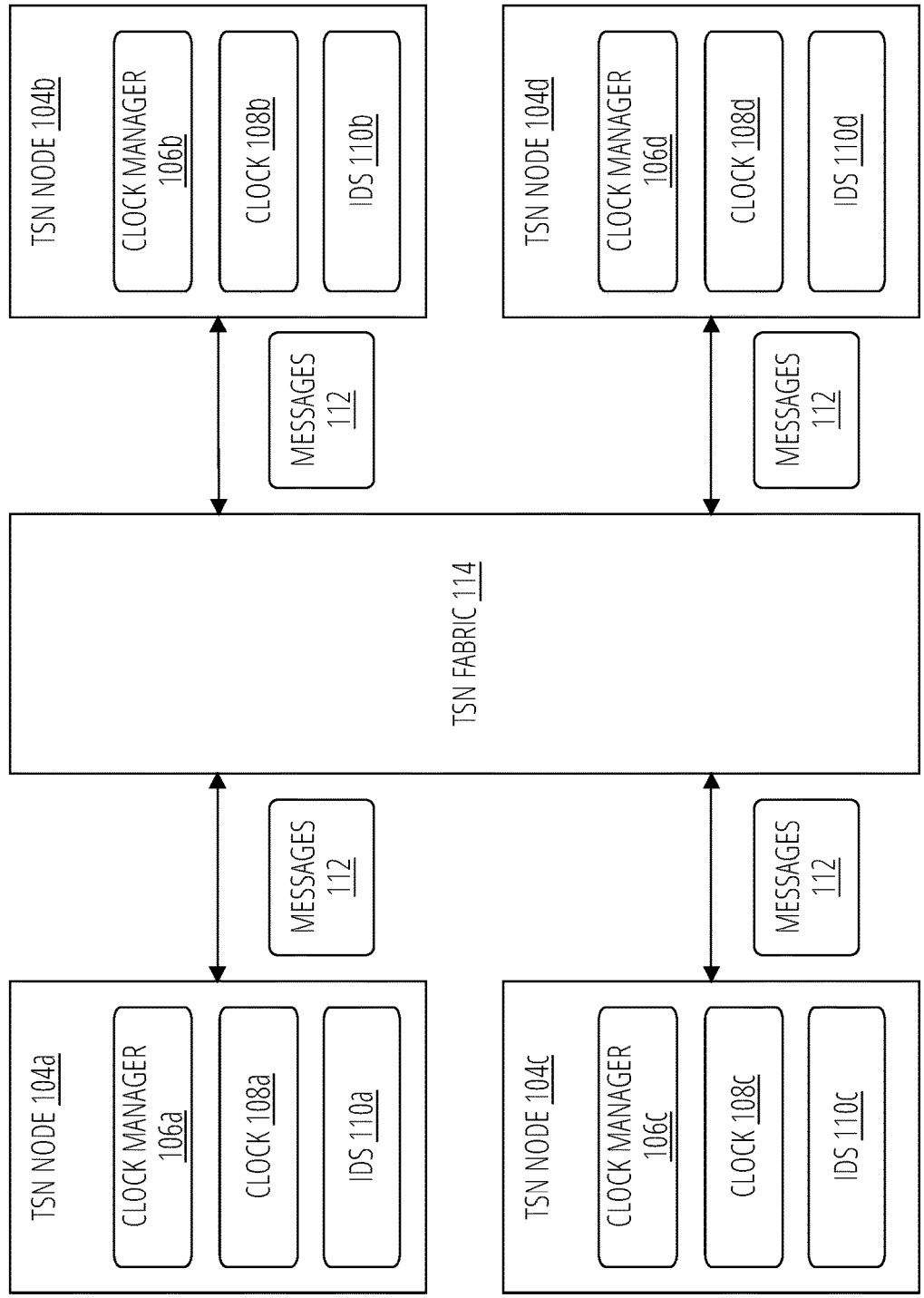
FIG. 1A illustrates an aspect of a time-synchronized network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to low-latency techniques to detect, quantify, and localize security attacks on time synchronization and traffic scheduling for systems operating on strict time requirements, such as systems based on time sensitive networks or time-synchronized networks (TSNs). Embodiments define and implement a novel heartbeat message that carries diagnostic information to assist an intrusion detection system (IDS) in detecting, quantifying and localizing a desynchronization attack on a network node of a TSN. The diagnostic information may comprise time information, such as timestamps, associated with key events in a network node of the TSN. A trusted entity communicates the heartbeat message at defined intervals in accordance with a security policy of the TSN or a TSN application. The security policy defines the heartbeat intervals based on time-sensitivity of the TSN or the TSN application. The heartbeat intervals may differ from time-synchronization protocols implemented for the TSN. In one embodiment, for example, the heartbeat interval may have a frequency that is greater than a synchronization interval set by the time-synchronization protocol.

As noted, TSN defines a set of standards (and amendments) with the aim to enable time synchronization and deterministic data delivery in converged networks where time sensitive traffic coexists with other types of traffic. Various standards have been developed to address time-synchronized or time-sensitive communications. By way of example and not limitation, some standards for enabling time-synchronized communications include those promulgated by the Institute of Electrical and Electronics Engineers (IEEE) and/or the International Electrotechnical Commission (IEC). For example, IEEE 1588, IEEE 802.1AS, IEEE 802.1Qbv and IEC/IEEE 60802 provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking for deterministic latency through traffic scheduling. In still another example, IEC/IEEE 60802 defines time-sensitive networking profiles for industrial automation. Other examples include a network time protocol (NTP) which is a networking protocol for clock synchronization between computer systems over packet-switched, variable-latency data networks, network time security (NTS) which is a secure version of NTP, and other time-synchronized network protocols. Embodiments are not limited to these examples.

A TSN typically implements some fundamental procedures (e.g., as defined by one or more standards) for all nodes operating within the TSN, such as time synchronization, traffic scheduling, packet format, reporting procedures, and so forth. For time synchronization, a clock leader has a clock that maintains a network time for a TSN. The clock leader periodically sends time information to clock followers. The clock followers use the time information to adjust local clocks and synchronize the local clocks to match the clock for the clock leader. This process is also followed by any intermediate nodes in the TSN, such as switches or relays. For traffic scheduling, a central network controller (CNC) node distributes a traffic schedule to some or all of the TSN nodes in the TSN. Time-aware traffic shaping grants transmission windows to time-synchronized nodes. Each node has a specific transmission window with a pre-determined cycle and duration. The nodes communicate streams of data (e.g., in the form of messages, packets or frames) using the transmission windows. The data streams flow from "talker nodes" to "listener nodes."

Attackers may utilize various attack vectors to implement a timing attack on a TSN to desynchronize the TSN. For instance, an attacker may inject malicious software (malware) into a TSN node or fake data into a data stream communicated between TSN nodes. An attack may attempt to tamper with time synchronization procedures for the TSN, thereby causing network nodes such as clock followers and switches, to be desynchronized in relation to a clock leader. The desynchronization causes the network nodes to shift timing windows, due to clock drift, which impacts traffic scheduling. This deteriorates timing guarantees between talker nodes and listener nodes. Accordingly, early detection of a corrupted messages and/or software components for a TSN node is critical within a TSN.

One conventional solution to address this problem is to implement one or more intrusion detection systems (IDSs) to monitor devices within a TSN to identify any abnormal behavior, such as a desynchronization attack that causes a desynchronization event. A desynchronization attack is a cyber-attack aimed at disrupting timing synchronization of a TSN. An IDS implements software, firmware or hardware to support one or more specialized security functions, such as detecting malicious behavior caused by an attacker. The IDS may be implemented on a TSN node or separate from a TSN node. The IDS receives as input messages containing time information for synchronizing a clock of a TSN node with a network time for the TSN. The IDS analyzes the messages to detect anomalies, such as slight modifications to the time information to cause a TSN node to update an internal clock with a wrong network time. Incorrect time synchronization can cause disruptions in time sensitive applications executing on the TSN node, such as causing collisions between cooperative robotic arms or delaying braking in an autonomous vehicle. When the IDS detects abnormalities in messages carrying time information, the IDS generates an alert and takes action to isolate any affected TSN applications and/or TSN nodes from a compromised TSN node.

A conventional IDS is designed to detect desynchronization events at certain defined time intervals, such as a synchronization interval defined by a TSN standard. For example, a TSN may implement various TSN standards in combination, such as IEEE 802.1AS to maintain a common network time across all nodes in a TSN, and IEEE 802.1Qbv to schedule transmission gates to provide bounded latency for a message. An attacker may attempt to modify timing synchronization messages for the 802.1AS protocol, which in turn may break the bounded latency set by the 802.1Qbv protocol by causing a desynchronization event. Since 802.1Qbv is strictly dependent on IEEE 802.1AS or IEEE 1588, any desynchronization will manifest in the 802.1Qbv protocol.

As a result, a conventional IDS typically attempts to detect such attacks during a synchronization interval as defined by 802.1AS. The synchronization interval in 802.1AS refers to the frequency at which synchronization messages are sent across the network. These messages are used to inform and adjust the clocks of all devices in the network, helping to keep them synchronized to a common time base. In some cases, for example, the synchronization interval for 802.1AS is commonly set to 125 milliseconds (ms). The exact synchronization interval can vary depending on the specific requirements of the system, the capabilities of the network hardware, and the level of precision needed. The intervals can even be adjusted dynamically depending on network conditions and system requirements.

In some cases, however, a desynchronization event for a TSN may occur faster than a given synchronization interval set for the TSN. In such cases, the TSN may need faster detection of a desynchronization attack to avoid catastrophic system failure. For instance, an autonomous vehicle may include sensors for light detection and ranging (LIDAR), radio detection and ranging (RADAR), cameras, ultrasonic sensors, inertial measurement units (IMUs), global positioning system (GPS) sensors, and so forth. A LIDAR sensor implemented for an autonomous vehicle and transported by a TSN operates at a frequency of 100 Hertz (Hz), which means it is taking 100 samples per second, or one sample every 10 ms. A sampling rate for a high-end LIDAR sensor operates at a higher frequency of 1 Megahertz (MHz), which means it is taking a sample every one millisecond. An IDS designed to detect a desynchronization event every 125 ms would be unable to detect a desynchronization event fast enough for a LIDAR sensor in an autonomous vehicle. This may cause the autonomous vehicle to incorrectly detect nearby objects, thereby causing a crash condition. Current detection solutions lack an efficient method to detect, quantify, and localize attacks in time synchronization and traffic scheduling in modern TSNs.

To solve these and other challenges in systems implementing time-synchronized networking operations, embodiments implement low-latency techniques to detect, quantify, and localize security attacks on time synchronization and traffic scheduling for systems operating on strict time requirements, such as TSNs. Various embodiments rely on precise high priority heartbeat message scheduling for inferencing stability of the network. A trusted entity, such as a CNC, distributes scheduled time intervals for a TSN node to communicate heartbeat messages, referred to as heartbeat intervals. The CNC may define the heartbeat intervals according to a security policy. For example, the defined heartbeat intervals may be shorter than a given synchronization interval for the TSN. The CNC may also define a higher priority level for the heartbeat messages relative to lower priority traffic messages to ensure a bounded latency for the heartbeat messages. The heartbeat message itself contains diagnostic information, such as immutable, or cryptographically secure, timestamps of key events of high priority messages, such as transmit and/or receive timestamps. Similarly, a cryptographic engine encrypts or provides message authentication codes to the heartbeat message and/or the diagnostic information to prevent unauthorized modification. A talker node or the CNC may generate the heartbeat messages according to a defined schedule (e.g., an 802.1Qbv schedule), and transmit the heartbeat messages to a listener node. Each intermediate network node along a network path between the talker node and the listener node, such as switch nodes or relay nodes, may add diagnostic information to the heartbeat messages, such as immutable timestamps of key events. The intermediate network nodes forward the heartbeat messages along the network path until it reaches the listener node. One or more IDS deployed to monitor the network nodes may analyze the immutable timestamps to determine whether the heartbeat messages are transported across the TSN within expected time intervals, as determined by a machine learning model, or other inferencing models, trained during benign conditions. Other inferencing models may include statistical-based models, rule-based models, signature-based models, or other models derived from first principles. When an IDS determines that the TSN is transporting the heartbeat message faster or slower than the expected time intervals, the IDS may generate a security alert and take various security actions as defined by a security policy for the TSN.

In one embodiment, for example, a computing apparatus may include a processing circuitry. The computing apparatus may include a memory storing instructions that, when executed by the processing circuitry, cause the processing circuitry to receive a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN. The processing circuitry may authenticate the heartbeat vector based on the message authentication code, retrieve a pair of timestamps from the heartbeat vector, determine an actual time difference based on the pair of timestamps, retrieve an expected time difference associated with the pair of timestamps, and detect a desynchronization event for the TSN based on the actual time difference and the expected time difference.

When a TSN implements heartbeat messages, an IDS can more quickly detect a desynchronization attack before the TSN or a TSN application for the TSN experiences a desynchronization event that may impair or disable operations of the TSN or the TSN application. This results in rapid detection, quantification and localization of network attacks, thereby improving reliability, availability and resiliency of a TSN, among other advantages.

FIG. 1A depicts an exemplary time-synchronized network (TSN) 102 implemented according to a TSN standard (e.g., IEEE 1588, IEEE 802.1AS, IEEE 802.1Qbv, or the like). As depicted, TSN 102 includes various TSN nodes 104, such as TSN nodes 104a-d. The TSN nodes 104 may be implemented as different types of nodes for a TSN, such as an origination node, relay node, switch node, end node, talker node, listener node, diagnostic stream producer, diagnostic stream consumer, and so forth. The TSN nodes 104a-d are communicatively coupled via a TSN fabric 114. The TSN fabric 114 can connect the TSN nodes 104a-d using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware and/or software components. As depicted in FIG. 1A, a TSN 104 includes a clock manager 106, a clock 108 and an intrusion detection system (IDS) 110 (referred to herein as an "IDS" or "detector"). For instance, the TSN node 104a includes a clock manager 106a, a clock 108a and an IDS 110a. The TSN node 104b includes a clock manager 106b, a clock 108b and an IDS 110b. The TSN nodes 104c, 104d are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The IDS 110 can be implemented as a software component, a hardware component, or a combination of both software and hardware components. Embodiments are not limited in this context.

The clock manager 106 generally manages a time (e.g., clock signals) generated by the clock 108. A key component in clock synchronization mechanisms is the clock manager software. In a time-synchronized network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The IDS 110 generally monitors the clock manager 106 to detect abnormal or malicious behavior of the TSN 102. In general, the IDS 110 is a device or software application that monitors a device, network or systems for malicious activity or policy violations. The IDS 110 may be specifically tuned to detect a timing attack, such as a desynchronization attack, or other TSN specific attack vector. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms. In addition to the TSN node 104, the IDS 110 may be implemented for other devices in the TSN, such as relay nodes 104a-104c, to provide a more comprehensive security solution against attacks.

The IDS 110 can operate in an on-line or off-line mode. When operating in an on-line mode, the IDS 110 examines network traffic in real time. It performs an analysis of passing traffic on the entire subnet, and matches the traffic that is passed on the subnets to the library of known attacks. For instance, it analyses the message 310 (e.g., a TSN timing message) and applies some rules, to decide if it is an attack or not. Off-line mode typically deals with stored data and passes it through some processes to decide if it is an attack or not. For the offline case, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a SIEM, a network administrator, or a software application to automatically implement security protocols, such as dropping the message 112, isolating an infected device guarded by the IDS 110, and/or re-configuring one or more network paths for impacted devices in the TSN network.

The IDS 110 can utilize any number of different methods to detect an attack. For instance, the IDS 110 may implement a signature-based method, a statistical anomaly-based method, a stateful protocol analysis method, machine-learning based, or some combination of all four methods. A signature-based IDS monitors packets in the network and compares with pre-configured and pre-determined attack patterns known as signatures. A statistical anomaly-based or machine-learning based IDS monitors network traffic and compares it against an established baseline. The baseline will identify what is "normal" for that network, such as what sort of bandwidth is generally used and what protocols are used. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 1B:
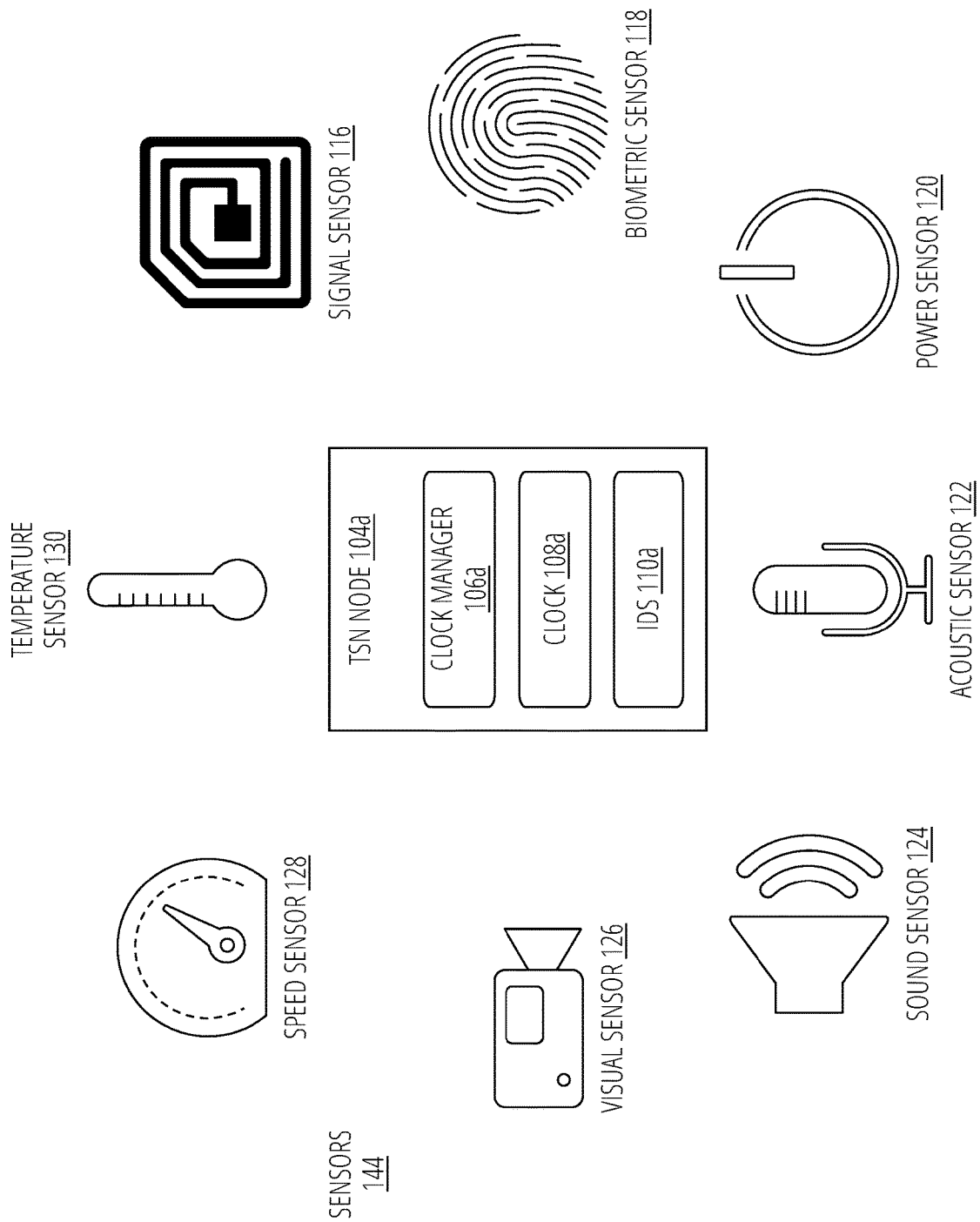
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the IDS 110. A physics-based approach utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

Figure 1C:
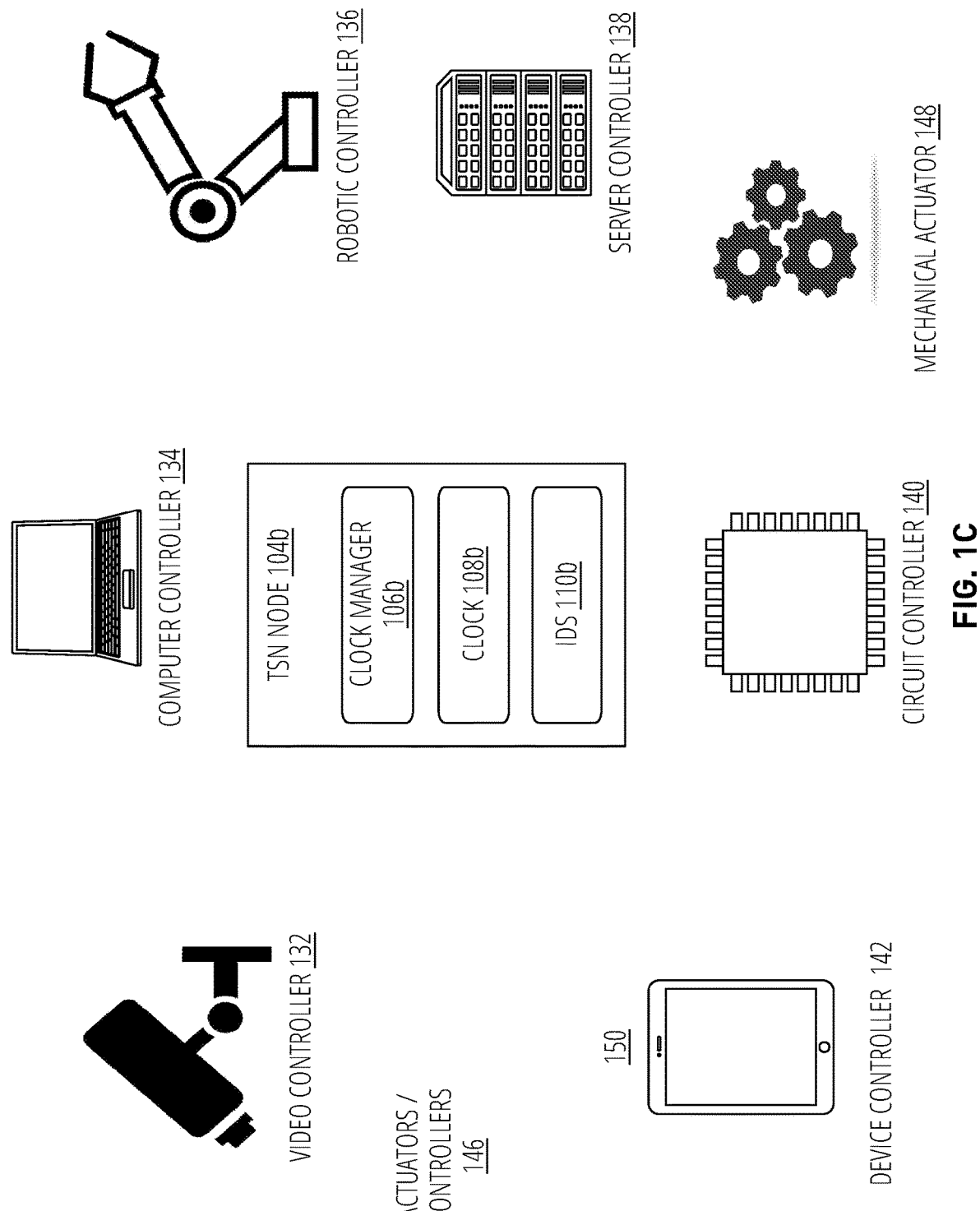
FIG. 1C illustrates an aspect of a TSN 102 for actuators in accordance with one embodiment.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the IDS 110, as discussed in more detail herein.

In time-synchronized networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock follower (CF) nodes to a clock leader (CL) node (e.g., a grand CL) through relay nodes or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device may suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time-synchronized network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
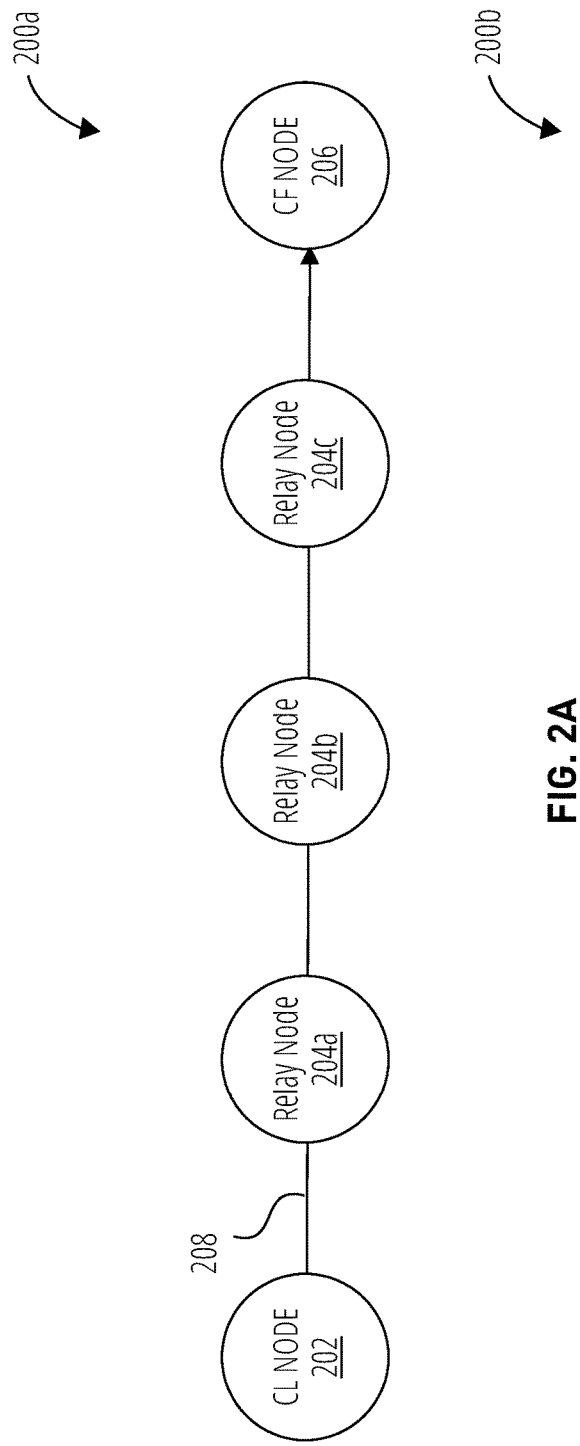
FIG. 2A illustrates an aspect of a TSN 200a in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes clock leader node 202, relay nodes 204a, 204b, and 204c, and clock follower node 206, all communicatively coupled via communication channel 208. The clock leader node 202 and the clock follower node 206 have a "master/slave" relationship, as defined in IEEE 1588 and IEEE 802.1AS, where the clock leader node 202 is treated as a "master" device and the clock follower node 206 is treated as a "slave" device. The clock leader node 202 includes a clock that maintains a network time for the TSN 102. The clock follower node 206 includes a clock that synchronizes a clock to the network time via one or more of the messages 112. Alternatively, nodes of the network may be implemented as a "talker node" and a "listener node", respectively. This configuration refers to data transmission, where the talker node transmits data and the listener node listens or receives data. This configuration is used, for example, in scheduled traffic.

Relay nodes 204a, 204b, and 204c are time-aware switching nodes and can be any number of devices in a network arranged to communicate information. A clock leader node 202 sends or originates information and a clock follower node 206 receives or consumes information. Examples of a clock leader node 202 or a clock follower node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive gate control list (GCL) tables. However, in some implementations, only clock leader nodes 202 and switching nodes (e.g., relay node 204a, etc.) receive GCL tables while destination devices (e.g., clock follower node 206) do not receive a GCL table.

Figure 2B:
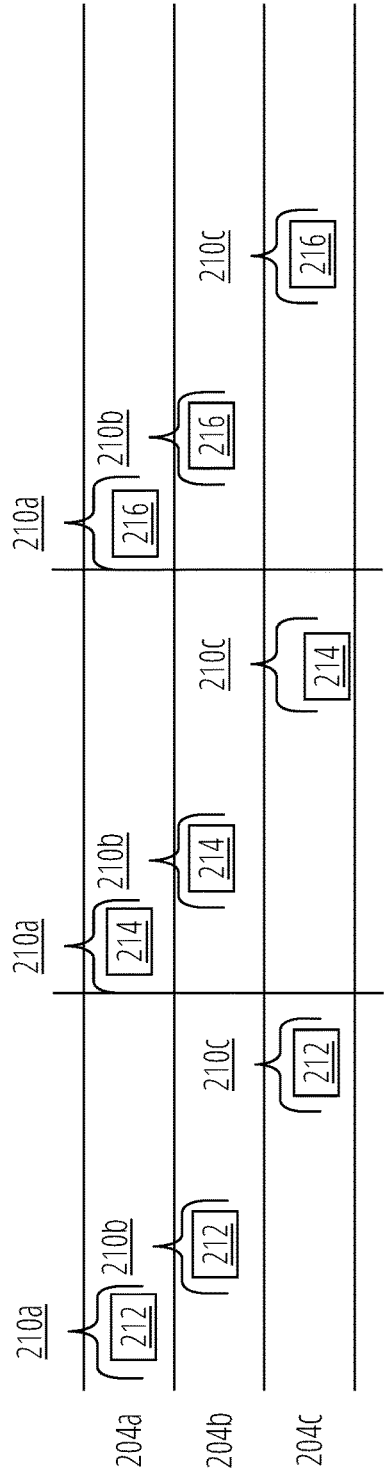
FIG. 2B illustrates an aspect of a timing diagram 200b in accordance with one embodiment.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
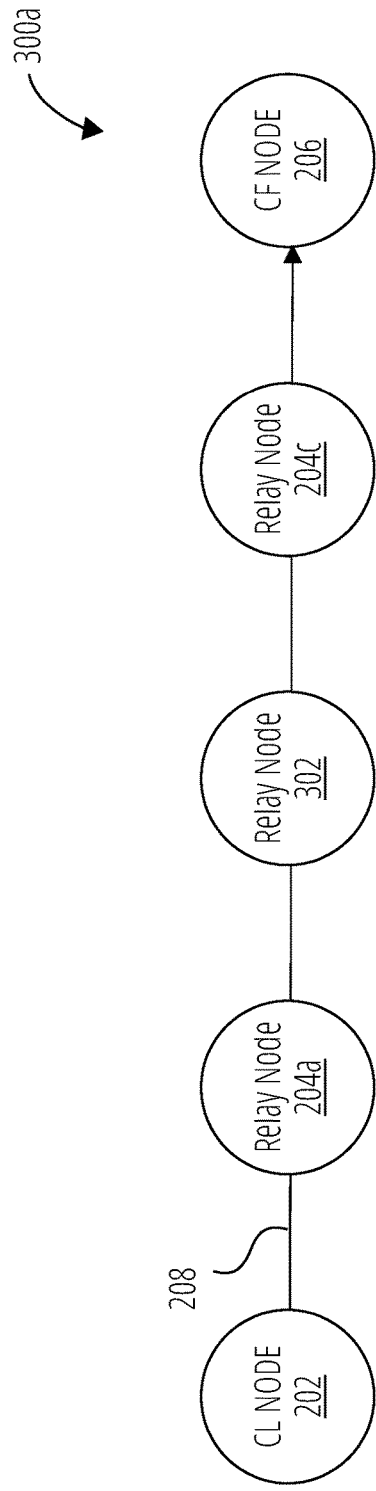
FIG. 3A illustrates an aspect of a TSN 300a in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
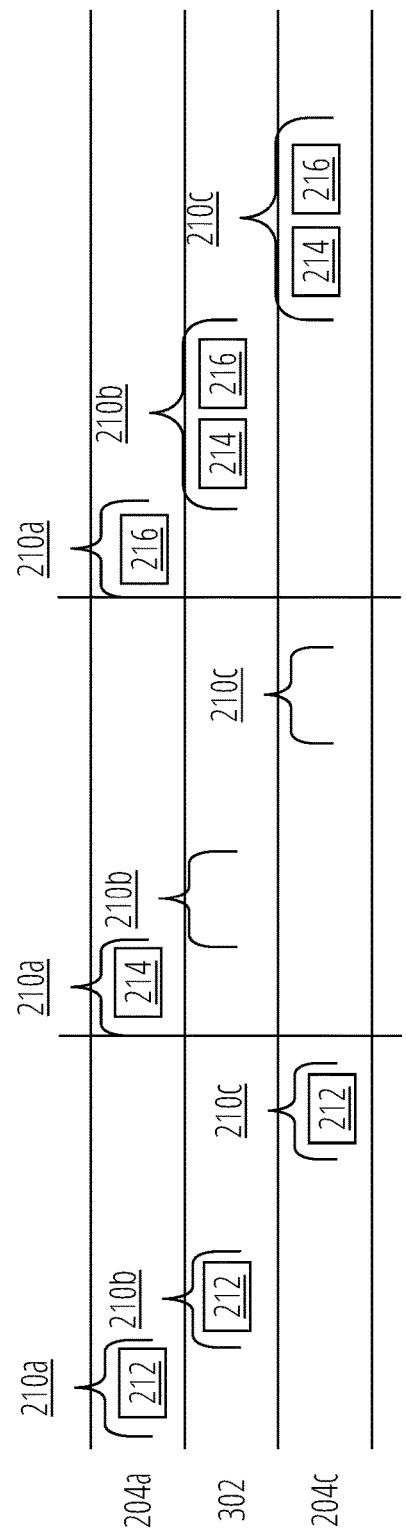
FIG. 3B illustrates an aspect of a timing diagram 300b in accordance with one embodiment.
Figure 4:
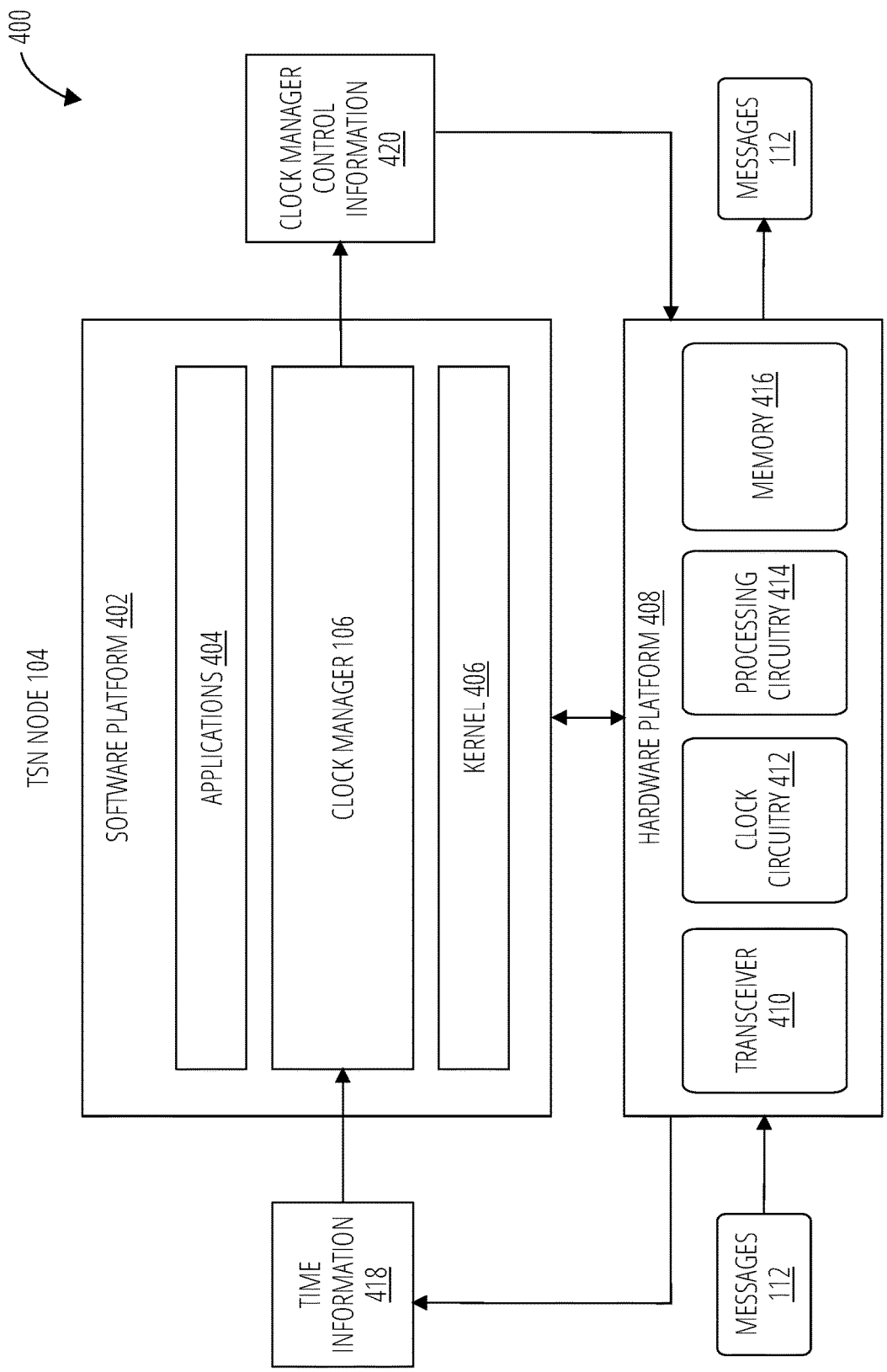
FIG. 4 illustrates an aspect of an apparatus 400 in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window, or alternatively, dropped completely. As a result of the delay in transmitting packet 214, relay node 302 breaks the latency bound of the stream that it is serving and can result in errors or comprise the safety of the system in which the nodes are operating FIG. 4 illustrates a more detailed view of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the TSN device 104 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5:
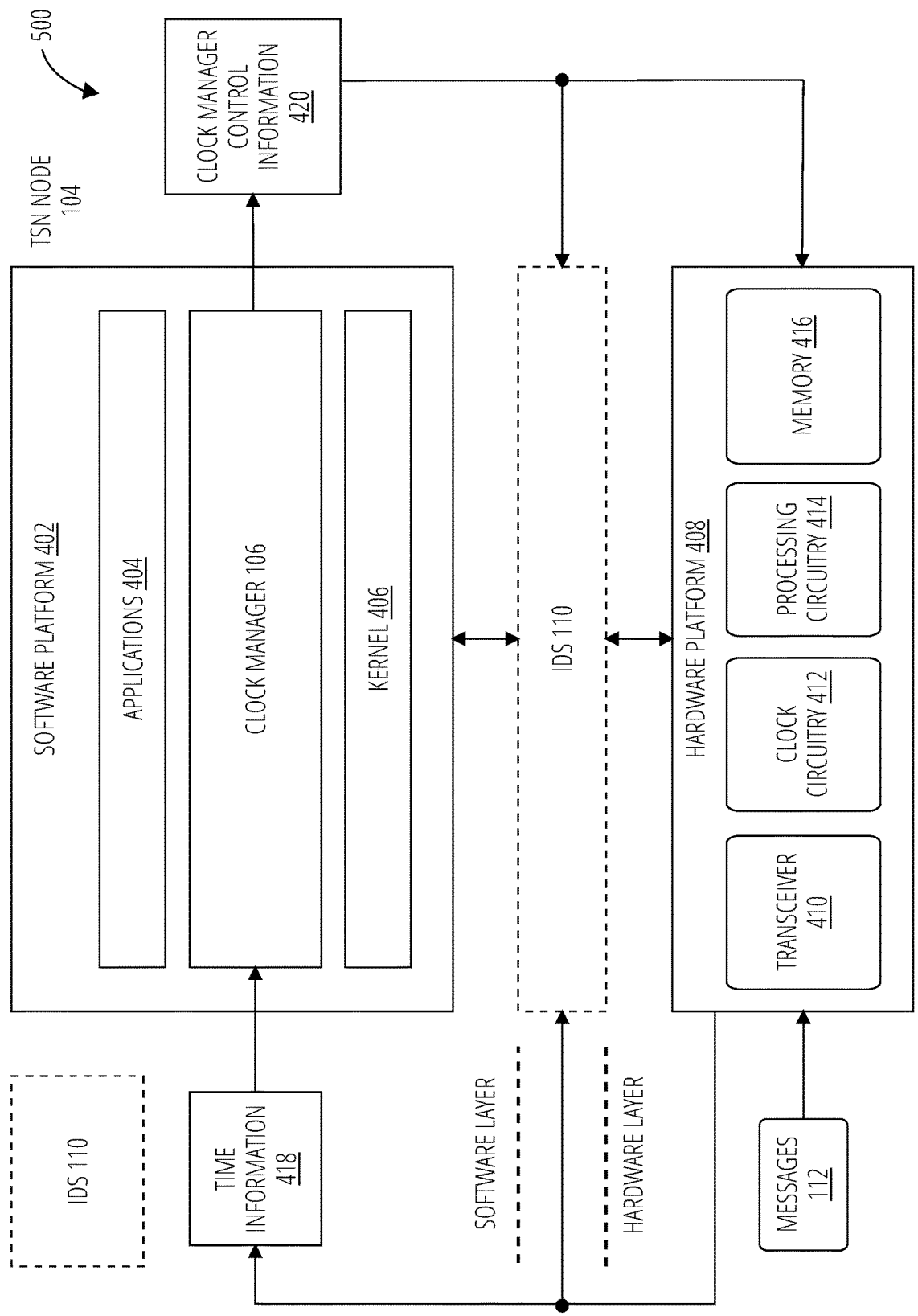
FIG. 5 illustrates an aspect of an apparatus 500 in accordance with one embodiment.

FIG. 5 illustrates an apparatus 500. Similar to the apparatus 400, the apparatus 500 includes a software platform 402 and a hardware platform 408. In addition, the apparatus 500 includes an IDS 110 to monitor a clock manager 106 of the software platform 402. As previously discussed, the IDS 110 generally monitors the clock manager 106 to detect abnormal or malicious behavior of the clock manager 106. More particularly, the IDS 110 monitors the inputs and/or outputs of the clock manager 106, such as consuming the time information 418 sent from the transceiver 410 to the clock manager 106 as input, and the clock manager control information 420 sent from the clock manager 106 to the clock circuitry 412 as output.

As depicted in FIG. 5, the apparatus 500 includes a clock circuitry 412 to implement a hardware clock (e.g., a PHC) for a device, such as a TSN node 104. The apparatus 500 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 500. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 500 further includes an IDS 110 coupled to the processing circuitry 414 and the clock circuitry 412. In one embodiment, the IDS 110 may be implemented as part of a software layer for the apparatus 500, such as the software platform 402. In another embodiment, the IDS 110 may be implemented as part of a hardware layer for the apparatus 500, such as the hardware platform 408. In yet another embodiment, certain elements of the IDS 110 may be implemented in the software platform 402, while other elements of the IDS 110 may be implemented in the hardware platform 408. Embodiments are not limited in this context.

Although FIG. 5 depicts the IDS 110 implemented as part of the apparatus 500, it may be appreciated that the IDS 110 may be implemented by another apparatus, device or system communicatively coupled to the apparatus 500. For instance, the IDS 110 may be implemented as part of an IDS for the apparatus 500 that is separate from the apparatus 500 or a device other than a device that implements the apparatus 500. For instance, if the apparatus 500 is implemented by a TSN node 104a, the IDS 110 of the apparatus 500 could optionally be implemented in a TSN node 104b. The IDS 110 could also be implemented by an IDS communicatively coupled to the TSN node 104, either directly via a wired or wireless connection, or indirectly via the TSN fabric 114. Embodiments are not limited in this context.

The IDS 110 is operative to consume multiple types of information to detect a security attack. For instance, the IDS 110 can receive and analyze messages 112 for a TSN node implementing the software platform 402 and/or the hardware platform 408. The messages 112 may carry time information for a TSN node, such as an origin time, resident time, link delays, among other types of clock information. The messages 112 may comprise, for example, synchronization messages or "FollowUp" messages. The TSN node retrieves or decodes the time information from the messages 112, and utilize the time information to synchronize an internal local clock with a network time issued by a clock leader or grand clock leader. The IDS 110 can also receive and analyze other types of information, such as clock manager control information 420 in transit from the clock manager 106 of the software platform 402 and the hardware platform 408. For instance, the IDS 110 can consume software control messages, or it can have one or more taps on a hardware bus or signal lines used to communicate electrical signals to the hardware platform 408. The IDS 110 analyzes the messages 112 and/or other types of information, and determines whether to generate an alert or take corrective action for the apparatus 500 based on results of the analysis.

The messages 112 are communicated between TSN nodes at a certain frequency or rate which can be measured in a number of messages sent or received per unit of time, such as a number of messages sent per second. This is referred to herein as a "message frequency." The message frequency for transmission of the messages 112, which carry origin time (Sync/FollowUp) and link delay computation (LDC), is typically dependent on the latency requirements of a time-sensitive application. The message frequency is usually calculated during a design phase for a TSN, considering a variety of factors, and instantiated during initialization of a TSN or individual TSN nodes.

As previously described, the message frequency for communicating messages, particularly synchronization messages, can have a significant impact on IDS operations for the TSN 102. Numerous security devices, such as the IDS 110, are deployed throughout the TSN 102. Each deployed IDS 110 monitors a TSN node 104 or a group of TSN nodes 104, receiving the messages 112 and analyzing the messages 112 for anomalies or abnormalities indicative of a security attack. In some cases, however, the TSN 102 may experience a desynchronization event before an IDS 110 can analyze a synchronization message to detect the underlying desynchronization attack. Consequently, the TSN 102 is at risk of suffering a catastrophic failure when the IDS 110 simply examines messages 112 at a message frequency set for the TSN 102.

To solve these and other challenges in systems implementing time-synchronized networking operations, embodiments implement low-latency techniques to detect, quantify, and localize security attacks on time synchronization and traffic scheduling for systems operating on strict time requirements, such as the TSN 102. Various embodiments rely on precise high priority heartbeat message scheduling for inferencing stability of the network. A more detailed description for an exemplary implementation of a heartbeat message scheme is discussed below.

Figure 6:
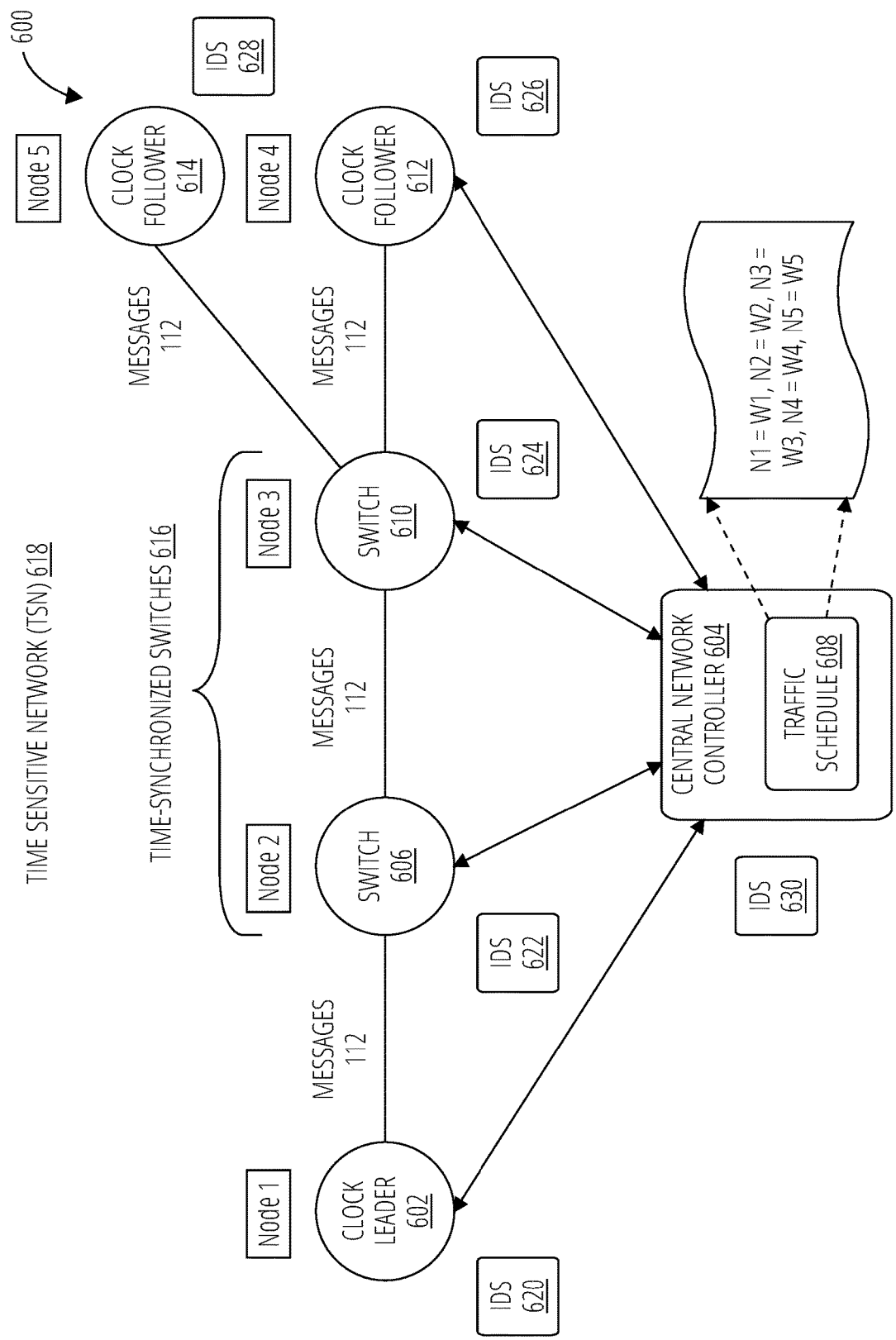
FIG. 6 illustrates an aspect of an operating environment 600 in accordance with one embodiment.

FIG. 6 illustrates an operating environment 600 for the TSN 618 implementing one or more TSN protocols, such as IEEE 802.1Qbv, for example. IEEE 802.1Qbv defines traffic scheduling for nodes 1 through 5 of the TSN 618. A central network controller 604 distributes a traffic schedule 608 to nodes 1 through 5. The traffic schedule 608 includes a time window assigned to each node 1 through 5. For instance, nodes (N) 1 through 5 may be assigned time windows (W) 1 through 5, respectively. Since the traffic schedule 608 is distributed to all the nodes 1 through 5, each of nodes 1 through 5 knows an assigned time window W1 through W5 for all nodes 1 through 5 in the TSN 102. This means each of nodes 1 through 5 can monitor an assigned time window W1 through W5 for any of the nodes 1 through 5, albeit using its own local clock.

Figure 7:
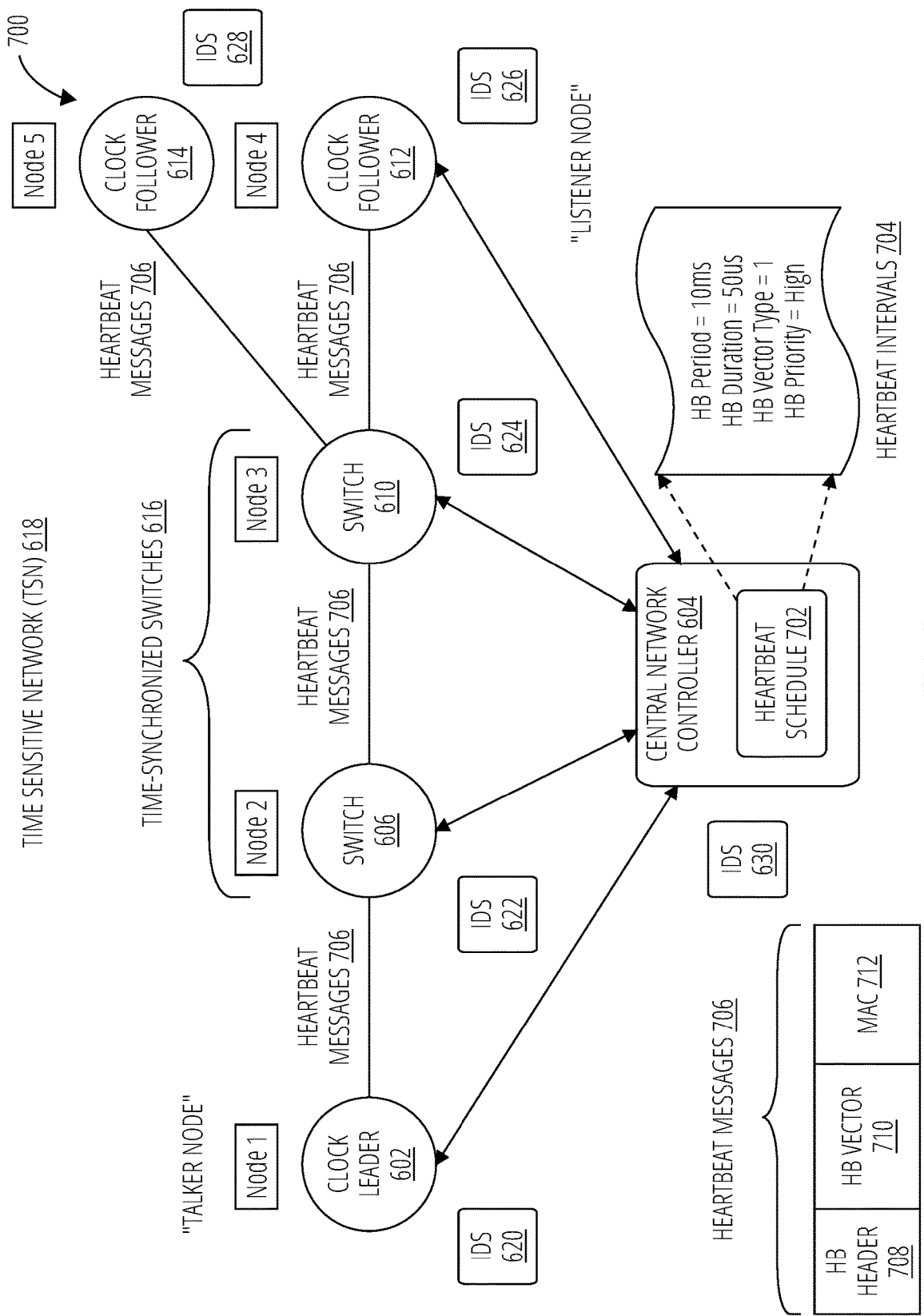
FIG. 7 illustrates an aspect of an operating environment 700 in accordance with one embodiment.

FIG. 7 illustrates an operating environment 700 for the TSN 618 implementing one or more TSN protocols, such as IEEE 1002.1Qbv, for example. In addition to the central network controller 604 distributing the traffic schedule 608 for the messages 112 transported through the TSN 618, the central network controller 604 may also distribute a heartbeat schedule 702 to schedule heartbeat messages 706 for transport through the TSN 618.

A "talker node" transmits heartbeat messages 706 to a "listener node." In general, a heartbeat message is a periodic signal used in computer networks and software to indicate the normal operation or functionality of a connection or a system. A heartbeat message is implemented in the TSN 618, where multiple network nodes or processes need to coordinate with each other. The heartbeat signals help an IDS monitor the health of the various network nodes.

As depicted in FIG. 7, each of the heartbeat messages 706 comprise custom, special or otherwise well-defined messages with various information elements (IEs), such as a heartbeat header 708, a heartbeat vector 710, and a MAC 712. The field lengths for each of the IEs are variable based on a particular implementation.

The heartbeat header 708 may include envelope information to assist in routing the heartbeat messages 706 along a network path of network nodes in the TSN 618. Examples of envelope information may include, without limitation, a source address, a destination address, a message number, a message identifier, a payload identifier, an encryption scheme identifier, a type identifier, and so forth.

The heartbeat vector 710 may include a set of timestamps for key events during transport of the heartbeat messages 706. A timestamp is a sequence of characters or encoded information identifying when a certain event occurred, usually giving date and time of day, sometimes accurate to a small fraction of a second. Examples of key events may include, without limitation, a timestamp associated with a transmitter hardware, a transmitter wakeup, a transmitter program, a transmitter kernel network scheduler, a transmitter kernel hardware, a receiver hardware, a receiver program, or any other timestamp associated with an event when a talker/listener exchange a heartbeat. In one embodiment, for example, the key events are when transmit hardware for a first network node in the TSN 618 transmits heartbeat messages 706 to a second network node in the TSN 618, and when receive hardware for the second network node receives the heartbeat messages 706 from the first network node, or vice-versa.

In one embodiment, the heartbeat vector 710 may include one or more immutable values of immutable data types, similar to a tuple. In computing, an immutable value is a value that, once created, cannot be changed. If there is a need to change an immutable value, the immutable value itself is not changed. Instead, a new one may be created based on the immutable value. Similarly, once a value such as a timestamp is added to the heartbeat vector 710, it cannot be altered. This ensures data integrity, consistency, and security for the heartbeat vector 710. This is particularly important for distributed systems, such as the TSN 618. This is because many copies of the same message are passed around between different network nodes. If part of a message were mutable, different network nodes might end up with different versions of the same message, leading to confusion and inconsistency. By making the timestamps in the heartbeat vector 710 for each of the heartbeat messages 706 immutable, the TSN 618 can ensure that all network nodes agree on the contents of a given heartbeat message.

New immutable values can be added to the heartbeat vector 710 as the heartbeat messages 706 traverse various network nodes in the TSN 618. For instance, transmit hardware for a first network node generates a first timestamp representing a transmission time for each of the heartbeat messages 706, which is added to the heartbeat vector 710. Receive hardware for a second network node generates a second timestamp representing a receive time for each of the heartbeat messages 706, which is also added to the heartbeat vector 710. Although the second network node can add the second timestamp to the heartbeat vector 710, the second network node cannot create, replace, update, delete (CRUD) or otherwise modify the first timestamp from the heartbeat vector 710 due to the use of authentication codes. If any of the fields are modified, the authentication code will not match and thus be discarded. Modification can be due to transmission corruption of attacker modification, for example. Additionally or alternatively, the second network node can generate a new heartbeat vector 710 using the old heartbeat vector 710 as input, as long as the original values for the old heartbeat vector 710 are preserved and recoverable by an IDS. Embodiments may implement the immutability property for the heartbeat vector 710 using a number of different cryptographic techniques, such as a symmetric or asymmetric cryptographic scheme, as described with reference to FIG. 12. Embodiments are not limited in this context.

The heartbeat messages 706 may further include a MAC 712. The MAC 712 is a message authentication code (MAC), which is a short piece of information used to confirm that a message came from the stated sender (e.g., authentication) and has not been changed in transit (e.g., integrity). The MAC 712 is a result of a cryptographic function that takes as input a message of any length and a secret key and produces a fixed-size output, the MAC value, often also called the tag. The purpose of the MAC is to authenticate the message: only someone who possesses the same secret key can generate the same MAC for the same message. This ensures that if two parties share a secret key, they can use MACs to authenticate the messages they send to each other. There are various types of MACs, including Hash-based Message Authentication Code (HMAC) and Cipher-based Message Authentication Code (CMAC), among others. HMACs are produced by using a cryptographic hash function in combination with a secret key, while CMACs use a block cipher in combination with a secret key. Despite the particular technique used to produce the MAC 712, the main objective remains the same, which is to verify the integrity of the information being sent and confirm the identity of the sender. In this manner, an IDS or network node may authenticate and confirm the identity of a sending network node in the TSN 618 using the MAC 712.

The heartbeat schedule 702 defines a schedule for transport of heartbeat messages 706 during heartbeat intervals 704 in accordance with a security policy for the TSN 618 or a TSN application dependent on the TSN 618. The heartbeat intervals 704 may comprise a set of parameters 1-M, where M represents any positive integer, that control transport of the heartbeat messages 706 through the various network nodes in the TSN 618.

In one embodiment, for example, the heartbeat intervals 704 may comprise 4 parameters (M=4), including: (1) a HB period; (2) a HB duration; (3) a HB vector type, and (4) a HB priority. The number and values for the parameters are variable, and the central network controller 604 may configure these parameters statically during network design and initialization of the TSN 618, or dynamically during network operations of the TSN 618.

The heartbeat intervals 704 may include a HB period parameter. The HB period parameter may be set to a value that controls a message frequency for the heartbeat messages 706. In one embodiment, for example, the defined heartbeat intervals 704 may be set to a time interval that is shorter than a given synchronization interval for the TSN 618. For instance, assume the TSN 618 has a message frequency for synchronization messages of 125 ms. In this case, the central network controller 604 may schedule a message frequency for heartbeat messages 706 to a shorter time interval. For example, a security policy for an autonomous driving application may include security measures needed for a LIDAR sensor taking samples at a sampling rate of 1 ms, and therefore may require detection of a desynchronization attack in 10 ms. In this case, the central network controller 604 may schedule the HB period to 10 ms.

The heartbeat intervals 704 may include a HB duration parameter. The HB duration parameter may be a set to a value that controls a duration for the heartbeat messages 706. Since the heartbeat messages 706 provide additional security benefits at the cost of additional traffic load, the heartbeat messages 706 may have a duration that optimizes a risk-reward balance for operation of the TSN 618. A longer duration increases detectability and resiliency at the sacrifice of network bandwidth and throughput. An autonomous vehicle may prioritize speed of detection over network speed, while an industrial robot might not. The HB duration parameter allows tuning of the TSN 618 for a given device, system or application.

The heartbeat intervals 704 may include a HB vector type parameter. The HB vector type parameter may be set to a value that controls a type of heartbeat vector 710 that is carried by the heartbeat messages 706 as a payload. As previously discussed, the heartbeat vector 710 is a set of timestamps for key events during transport of the heartbeat messages 706. In one embodiment, there may be 3 different HB vector types designated as vector type 1, vector type 2 and vector type 3 that respectively correspond to: (1) an end-to-end HB vector; (2) a talker-listener HB vector; or (3) point-to-point HB vector. The vector type 1 is a vector that includes a set of timestamps for each key event along an end-to-end network path from a talker node through intermediate nodes to a listener node. The vector type 2 is a vector that includes a set of timestamps for each key event of the talker node and the listener node, and effectively omits any timestamps for intermediate nodes. The vector type 3 is a vector that includes a set of timestamps for each key event occurring for transmit links along the end-to-end network path from a talker node through intermediate nodes to a listener node. The vector type 3 may group a pair of timestamps to include a transmit hardware timestamp and a receive hardware timestamp to represent each link, where each link is a number of network nodes (N) minus 1 (N−1).

The heartbeat intervals 704 may include a HB priority parameter. The HB priority parameter may be set to a value that controls a priority level for the heartbeat messages 706 in accordance with a priority scheme implemented for the TSN 618. The central network controller 604 may define a higher priority level for the heartbeat messages 706 relative to lower priority traffic messages to ensure a bounded latency for the heartbeat messages 706. In one embodiment, for example, the TSN 618 may implement a priority scheme for network traffic having three priority level, such as: (1) High; (2) Normal; or (3) Low. In this case, the HB priority parameter would be set to HIGH to ensure that it has priority relative to other network traffic carried by the TSN 618.

By way of example, as depicted in FIG. 7, assume the central network controller 604 distributes the heartbeat schedule 702 to the nodes 1-5 of the TSN 618. Further assume the heartbeat schedule 702 includes example values for the TSN 618 as follows: (1) a HB period of 10 ms; (2) a HB duration of 50 us; (3) a HB vector type set to 1, and (4) a HB priority set to HIGH. It may be appreciated that more or less HB parameters, with more or less granularity of parameter values, may be implemented for a given TSN 618. Embodiments are not limited in this context.

In operation, node 1 operates as a talker node to send heartbeat messages to node 4 operating as a listener node. Node 1 would generate and transmit heartbeat messages 706 to node 4 in accordance with the heartbeat schedule 702 at heartbeat intervals 704. The heartbeat messages 706 would contain diagnostic information, such as immutable, or cryptographically secure, timestamps of key events of high priority messages, such as transmit and/or receive timestamps, for each of nodes 1-4. The diagnostic information would be in the form heartbeat vectors 710 of vector type 1, which is an end-to-end HB vector. Similarly, a cryptographic engine (not shown) encrypts the heartbeat messages 706 and/or the heartbeat vector 710 to prevent unauthorized modification using a MAC scheme to generate a MAC 712. Each intermediate network node 2, 3 along a network path between the talker node (node 1) and the listener node (node 4), such as switch nodes 606, 610, respectively, may add diagnostic information to the heartbeat vector 710 of the heartbeat messages 706, such as immutable timestamps of key events. The intermediate network nodes 2, 3 forward the heartbeat messages 706 along the network path until each one reaches the listener node (node 4).

One or more of IDS 620, IDS 622, IDS 624, IDS 626 and/or IDS 628 deployed to monitor the network nodes 1-5 may analyze the immutable timestamps carried by the heartbeat vector 710 to determine whether the network nodes are transporting the heartbeat messages 706 across the TSN 618 within an expected time intervals. A machine learning model may be trained and deployed for each of the IDS to receive as input the timestamps from the heartbeat vector 710 and classify the heartbeat vector 710 as benign or malicious, where the benign category indicates normal operating environment and malicious indicates an attack environment. When an IDS determines that the TSN 618 is transporting the heartbeat messages 706 faster or slower than the expected time intervals, the IDS may generate a security alert and take various security actions as defined by a security policy for the TSN 618.

Figure 8:
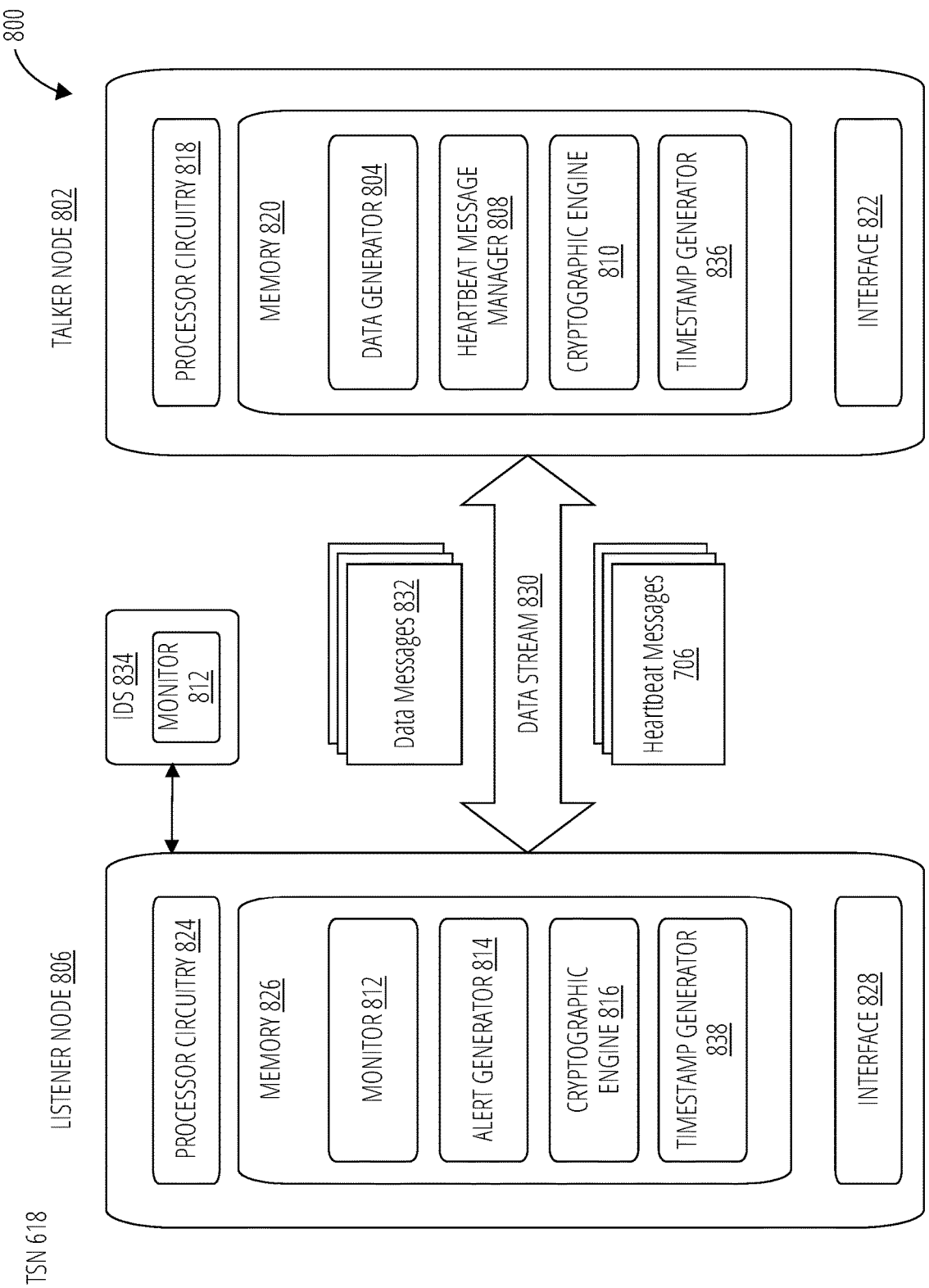
FIG. 8 illustrates an aspect of a system 800 in accordance with one embodiment.

FIG. 8 illustrates a system 800 suitable for any TSN as discussed herein, such as the TSN 618 (or TSN 102), for example. As depicted in FIG. 8, the system 800 may include a talker node 802 and a listener node 806. In one embodiment, for example, the talker node 802 and the listener node 806 are both TSN nodes 104 within the TSN 618. In one embodiment, for example, the talker node 802 may be representative of any network node in the TSN 618, such as node 1 of FIG. 7, and the listener node 806 may be representative of any network node in the TSN 618 other than the talker node 802, such as node 4 of FIG. 7. While system 800 depicts a single talker node 802 and a single listener node 806 for purposes of clarity, it may be appreciated that the system 800 can implement multiple talker nodes 802 and listener nodes 806. Further, while not depicted in FIG. 8, there may be a number of intermediate nodes (not shown) along a network path between the talker node 802 and the listener node 806, such as nodes 2, 3. Embodiments are not limited in this context.

In general operation, the talker node 802 may produce various types of information that may be communicated to the listener node 806 over various communications channels implemented by the TSN 618. More particularly, as depicted in FIG. 8, the talker node 802 may produce various types of information that may be communicated to the listener node 806 via a data stream 830 (e.g., data traffic). A data stream 830 may communicate data information for a network node via one or more data messages 832. For example, the data information may comprise normal TSN and regular data traffic, such as control information, application information, management information, timing information, protocol information, and so forth. A data stream 830 may also communicate diagnostic information for a network node via one or more heartbeat messages 706. The data stream 830 may communicate a combination of data messages 832 and heartbeat messages 706 in a single unified information stream by interleaving data messages 832 and heartbeat messages 706 according to a defined protocol format. Alternatively, the heartbeat messages 706 may be transmitted in a separate diagnostic stream (not shown).

Although some embodiments may be described as a talker node 802 sending diagnostic information via heartbeat messages 706 in a data stream 830 to a listener node 806, it may be appreciated that the listener node 806 may send heartbeat messages 706 to the talker node 802 as well. Furthermore, any network node in the TSN 618 can operate as a talker node 802 or a listener node 806. Embodiments are not limited in this context.

In one embodiment, for example, a talker node 802 such as a TSN node 104 may be implemented, at least in part, by a computing apparatus that includes processor circuitry 818, memory 820 and an interface 822. The memory 820 may be communicatively coupled to the processor circuitry 818 and the interface 822. The memory 820 may store instructions that when executed by the processor circuitry 818, causes the processor circuitry 818 to perform one or more operations for the talker node 802. Additionally, or alternatively, the operations may be executed by dedicated hardware (e.g., DSP, ASIC, FPGA, circuitry, etc.), or a combination of hardware and software. Embodiments are not limited in this context.

The processor circuitry 818 may execute instructions for a data generator 804. The data generator 804 may prepare a data stream 830 for transmission from the talker node 802 to a listener node 806 within a time window assigned to the talker node 802 in the TSN 618. The data generator 804 may determine an amount of transmit time needed to send the data stream 830 from the talker node 802 to the listener node 806 during the time window 670 assigned to the talker node 802.

In one embodiment, for example, the central network controller 604 may assign a time window to the talker node 802 prior to sending the data messages 832 and the heartbeat messages 706 in the data stream 830. The central network controller 604 may distribute a schedule of time window assignments for the TSN nodes 104 to some or all of the TSN nodes 104 within the TSN 102 or TSN 618, such as the traffic schedule 608. The schedule of time window assignments include time window assignments for some or all of the TSN nodes 104 within the TSN 618. In this manner, one TSN node 104 will know time window assignments for other TSN nodes 104 in the TSN 102, and can monitor time windows for the other TSN nodes 104 when receiving packets and frames for the other TSN nodes 104. The time window may be defined in accordance with any TSN or network protocols, such as a time window as defined by IEEE 802.1Qbv, for example. Embodiments are not limited to an IEEE 802.1Qbv, and other time windows defined by other TSN protocols may be used for a given implementation.

The processor circuitry 818 may execute instructions for a heartbeat message manager 808. In general, the heartbeat message manager 808 may generate a set of heartbeat messages 706 for a given TSN node 104 operating as a talker node 802. A security monitor 812, implemented by the listener node 806 or an IDS 834 monitoring and protecting the listener node 806, may receive the heartbeat messages 706 for the TSN node 104, analyze the heartbeat vector 710 carried by the heartbeat messages 706, and determine whether a TSN node 104 associated with one or more timestamps (e.g., the talker node 802) carried by the heartbeat vector 710 has been compromised or is under a security attack.

Attackers may utilize various attack vectors to implement a timing attack on a TSN node 104, such as a talker node 802, in order to desynchronize the synchronized timing of the TSN 102. For instance, an attacker may inject malicious software (malware) into the talker node 802 or inject fake data into timing information received by the talker node 802 in order to cause a local clock 108 for the talker node 802 to maintain a local time that is different from the network time of the TSN 618. The desynchronization causes the talker node 802 to shift its assigned timing window 670, due to clock drift, which impacts traffic scheduling. This deteriorates timing guarantees between the talker node 802 and other TSN nodes 104 in the TSN 102, such as the listener node 806, for example. Another example of an attack is when other TSN nodes 104 along a network path to the monitor 812 (e.g., intermediate nodes) are impacted and therefore a misalignment of the windows will occur at these TSN nodes 104.

It may be possible, however, for an attacker to intercept the heartbeat message 1010 in order to modify the set of Heartbeat message 1010 or forge a fake set of Heartbeat message 1010. In order to enhance security for Heartbeat message 1010, each of the heartbeat message 1010 is designed to be unique, bounded to a TSN node 104, and unforgeable. A heartbeat message is made unique and unforgeable using a pair-wise cryptographic key shared between a TSN node 104 and a monitor 812. A keyed hash binds the node number and the packet sequence number. Further, each of the heartbeat message 1010 has a unique identifier with a defined minimum size or bit-width. Forgery can happen during message relay within a resident time.

After relaying a message, freshness of the identifier forces a brand-new forgery attempt. For example, an Ethernet packet minimum payload can accommodate identifiers up to 368 bits long.

The heartbeat message manager 808 may generate a set of heartbeat messages 706 for the talker node 802 based on the definitions and parameters in the heartbeat schedule 702. The heartbeat message manager 808 may generate and initiate transmission of the heartbeat message 1010 in accordance with the heartbeat intervals 704. Each of the heartbeat message 1010 have a format that includes a heartbeat header 708, a heartbeat vector 710, and a MAC 712. Since the system 800 includes only a talker node 802 and a listener node 806, the heartbeat vector 710 may be implemented as any of the HB vector type 1, 2 or 3.

The heartbeat vector 710 may include a set of timestamps associated with key events of the talker node 802 and the listener node 806. For example, the processor circuitry 818 of the talker node 802 may execute instructions for a timestamp generator 836, and the processor circuitry 824 of the listener node 806 of the listener node 806 may execute instructions for the timestamp generator 838. In one embodiment, the timestamp generator 836 generates a timestamp indicating a time when transmitter hardware for the interface 822 transmits each of the heartbeat messages 706 from the talker node 802 to the listener node 806. In one embodiment, the timestamp generator 838 generates a timestamp indicating when receiver hardware for the interface 828 of the listener node 806 receives each of the heartbeat messages 706 from the talker node 802. The timestamp generator 836 adds the transmit timestamp to the heartbeat vector 710 prior to encryption and transmission of the heartbeat messages 706 from the talker node 802. The timestamp generator 838 adds the receive timestamp to the heartbeat vector 710 after decryption/MAC verification and reception of the heartbeat messages 706 by the listener node 806.

The heartbeat messages 706 and/or a heartbeat vector 710 carried by the heartbeat messages 706 may comprise an authentication code, such as the MAC 712. In one embodiment, for example, the authentication code may be generated by a cryptographic key used by the talker node 802 and the listener node 806 of the TSN 102. The authentication code may represent any cryptographically secure authentication code generated in accordance with a given cryptographic scheme, such as symmetric-key schemes, asymmetric-key schemes, public key encryption schemes, Rivest-Shamir-Adleman (RSA) public key encryption schemes, and so forth. Embodiments are not limited to a particular cryptographic scheme.

For example, the processor circuitry 818 may execute instructions for a cryptographic engine 810. The cryptographic engine 810 may generate authentication codes, such as the MAC 712, for the talker node 802. The cryptographic engine 810 may receive as input a set of cryptographic information, such as a symmetric or asymmetric security key, and output the authentication codes based on the security key. The heartbeat message manager 808 may generate and output the heartbeat messages 706 to the cryptographic engine 810. The cryptographic engine 810 may receive as input the heartbeat messages 706 from the heartbeat message manager 808, and generate an authentication code such as the MAC 712 for each of the heartbeat messages 706. An interface 822 may send the heartbeat messages 706 in the data stream 830 from the talker node 802 to the listener node 806.

In one embodiment, for example, a listener node 806 such as a TSN 104 may be implemented, at least in part, by a computing apparatus that includes processor circuitry 824, memory 826 and an interface 828. The memory 826 may be communicatively coupled to the processor circuitry 824 and the interface 828. The memory 826 may store instructions that when executed by the processor circuitry 824, causes the processor circuitry 824 to perform one or more operations for a listener node 806. Additionally, or alternatively, the operations may be executed by dedicated hardware (e.g., DSP, ASIC, FPGA, circuitry, etc.), or a combination of hardware and software. Embodiments are not limited in this context.

The processor circuitry 824 may execute instructions for a monitor 812. The monitor 812 may receive one or more heartbeat messages 706 from the data stream 830 via the interface 828. The processor circuitry 824 may execute instructions for a cryptographic engine 816 to authenticate the heartbeat messages 706 based on the MAC 712. The cryptographic engine 816 may receive as input the MAC 712 and a set of cryptographic information, such as a symmetric or asymmetric security key, and output a verification that the MAC 712 is based on the security key. The monitor 812 may receive as input the verification or authentication from the cryptographic engine 816.

Once authentication and verification is complete, the monitor 812 may analyze the set of timestamps in the heartbeat vector 710 to determine whether there is a deviation from expected values, thereby providing some indications of a desynchronization attack. The monitor 812 may compare a desynchronization time with a defined threshold, determine whether the comparison indicates sufficient evidence of a security attack on the talker node 802. For example, the monitor 812 may determine a desynchronization time interval between an actual time difference between a pair of timestamps and an expected time difference between the pair of timestamps. The expected time difference can be measured or calculated for the network nodes 104 of the TSN 618 under benign or normal operating conditions.

By way of example, a machine learning model, such as a machine learning classifier, may receive the desynchronization time interval as input, and classify the desynchronization time interval as benign or malicious. A benign classification may indicate the desynchronization time interval is within a defined statistical variance around a median or mean time value, and a malicious classification indicating the desynchronization time interval is outside of the defined statistical variance and therefore indicative of a potential desynchronization event. In response to a malicious classification, the monitor 812 may output a control signal to indicate there is sufficient evidence of a security attack to generate an alarm or alert and take corrective security actions in response to the security attack.

The processor circuitry 824 may execute instructions for an alert generator 814. The alert generator 814 may receive the control signal indicating a desynchronization attack is occurring on the talker node 802 or an intermediate node (not shown) from the monitor 812, and generate an alert for the TSN 102 indicating the first TSN node 104 is under a security attack. The listener node 806 may send an alert message to a CNC or a SIEM via the interface 828. The CNC or SIEM may initiate security procedures in response to the security attack, such as isolating the talker node 802, updating routing tables for other TSN nodes 104 within the TSN 618 (e.g., switch nodes, relay nodes, etc.), informing neighboring TSN nodes of the attack on the talker node 802, and other corrective actions.

Figure 9:
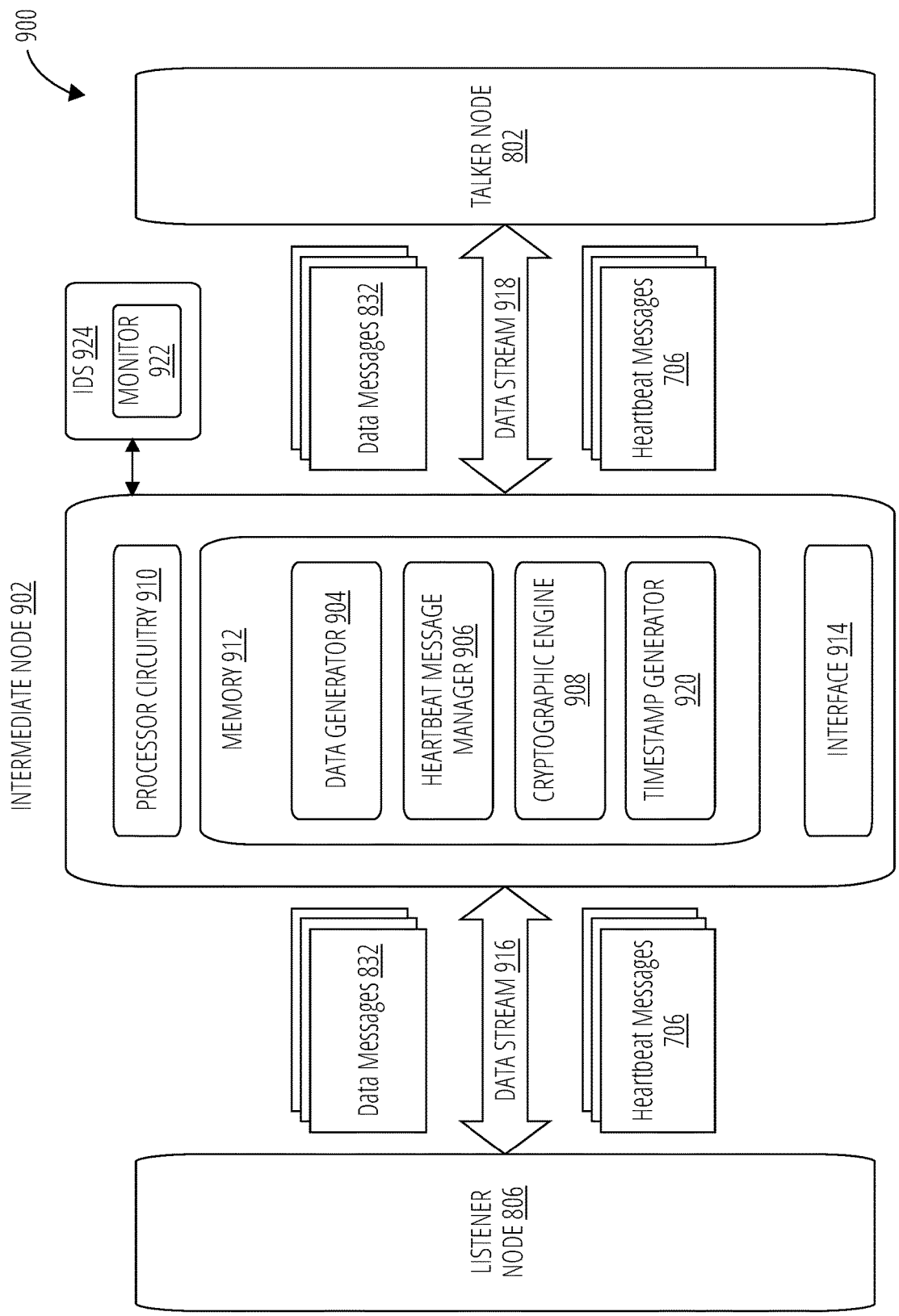
FIG. 9 illustrates an aspect of a system 900 in accordance with one embodiment.

FIG. 9 illustrates a system 900 suitable for any TSN as discussed herein, such as the TSN 618 (or TSN 102), for example. Similar to FIG. 8, the system 900 may include a talker node 802 and a listener node 806. In addition, the system 900 includes an intermediate node 902, which is a network node along a network path between the talker node 802 and the listener node 806. In one embodiment, for example, the talker node 802, the intermediate node 902, and the listener node 806 are all TSN nodes 104 within the TSN 618. In one embodiment, for example, the talker node 802 may be representative of node 1, the intermediate node 902 may be representative of node 2 or node 3, and the listener node 806 may be representative of node 4, as discussed with reference to FIG. 7. While system 900 depicts a single intermediate node 902 for purposes of clarity, it may be appreciated that the system 900 can implement multiple intermediate nodes 902. Embodiments are not limited in this context.

The intermediate node 902 includes processor circuitry 910, memory 912 and an interface 914, which are all similar to the same entities discussed with reference to FIG. 8. In some cases, the intermediate node 902 can also operate as a talker node 802 using the data generator 904, the heartbeat message manager 906, the cryptographic engine 908, and the timestamp generator 920.

When the intermediate node 902 operates as a relay or switch node in the TSN 618, such as switch 606 and/or switch 610 of nodes 2 and 3, respectively, the intermediate node 902 relays or switches the heartbeat messages 706 from the talker node 802 to the listener node 806. The intermediate node 902 receives the heartbeat messages 706 from the talker node 802 or another intermediate node 902 (not shown). The cryptographic engine 908 authenticates the heartbeat messages 706 using the associated MACs 712. Once authenticated, the heartbeat message manager 808 retrieves the heartbeat vectors 710 from the heartbeat messages 706. The heartbeat message manager 906 receives a timestamp from the timestamp generator 920, and adds the timestamp to the heartbeat vector 710 for key events occurring at the intermediate node 902, such as a timestamp to indicate a time when receive hardware of the interface 914 receives a heartbeat message 706, and a timestamp to indicate a time when transmit hardware of the interface 914 transmits the heartbeat message 706 to its next hop in the network path to the listener node 806. Since the timestamps carried by the heartbeat vector 710 are immutable, the intermediate node 902 can only add timestamps to the heartbeat vector 710.

In some embodiments, the intermediate node 902 may implement a security monitor 922 similar to the security monitor 812 or may be protected by an IDS 924 with the security monitor 922. In such cases, the cryptographic engine 908 of the intermediate node 902 may decrypt and analyze the timestamps carried by the heartbeat vector 710 for desynchronization attacks indicating a desynchronization event. An alert generator similar to the alert generator 814 may be used to generate alerts, report incidents, and take corrective security actions.

In other embodiments, the intermediate node 902 does not implement or have access to the security monitor 922. In such cases, the intermediate node 902 may not be able to decrypt or read the timestamps carried by the heartbeat vector 710.

Figure 10A:
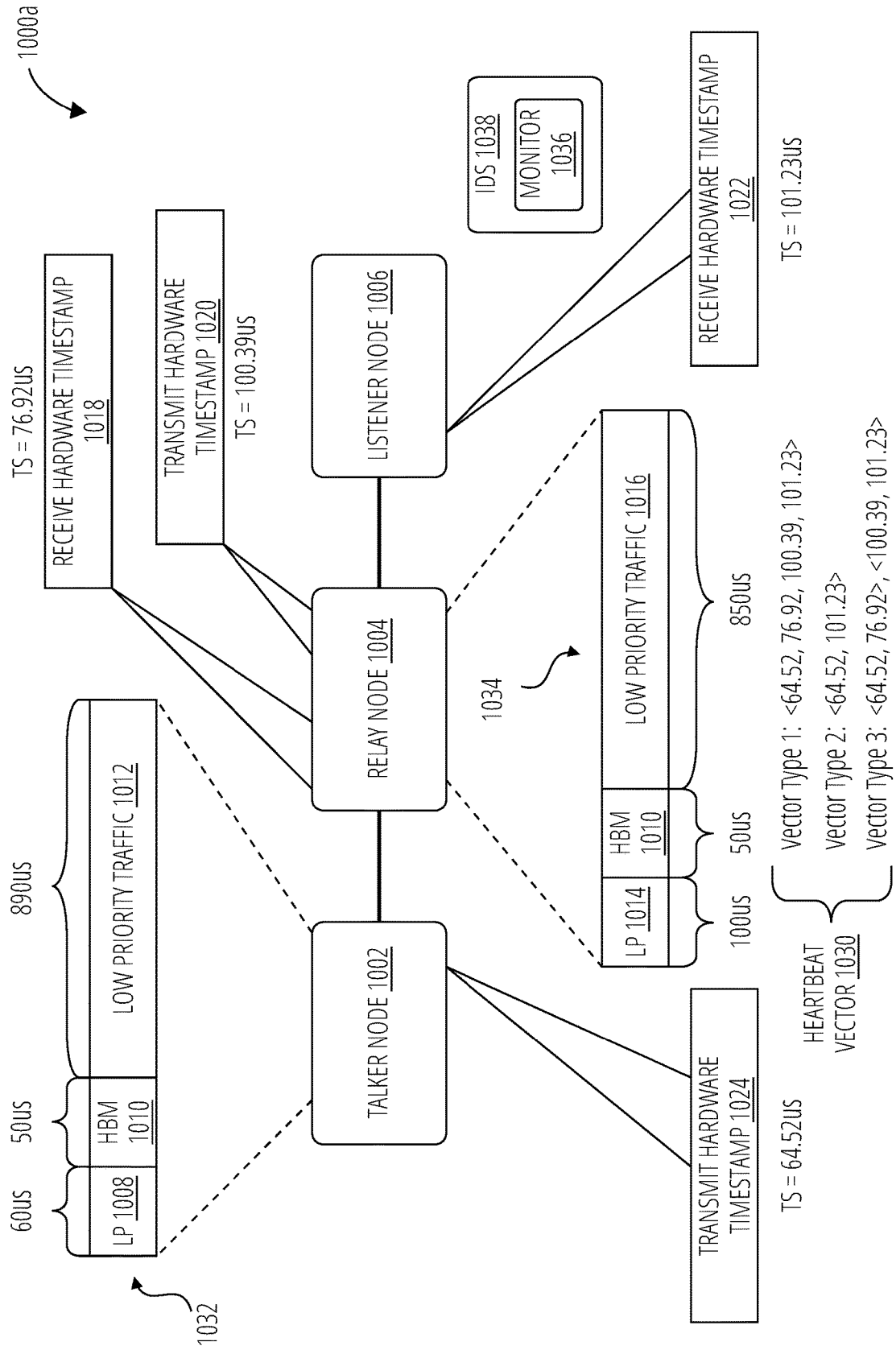
FIG. 10A illustrates an aspect of a benign operating environment 1000a in accordance with one embodiment.

FIG. 10A illustrates a benign operating environment 1000a for the TSN 618. As depicted in FIG. 10A, a talker node 1002 transmits a data stream 1032 to a relay node 1004. The data stream 1032 includes low priority traffic 1008 and low priority traffic 1012 with a high priority heartbeat message 1010 interleaved in-between. The relay node 1004 transmits a data stream 1034 to a listener node 1006. The data stream 1032 includes low priority traffic 1014 and low priority traffic 1016 with the high priority heartbeat message 1010 interleaved in-between.

The heartbeat message 1010 includes a heartbeat vector 1030. The talker nodes 1002, the relay node 1004 and the listener node 1006 add timestamps of key events to the heartbeat vector 1030 as it traverses the TSN 618. For example, the talker node 1002 adds a transmit hardware timestamp 1024 of 64.52 µs, the relay node 1004 adds a receive hardware timestamp 1018 of 76.92 µs and a transmit hardware timestamp 1020 of 100.39 µs, and the listener node 1006 adds a receive hardware timestamp 1022 of 101.23 µs. If the heartbeat vector 1030 is a vector type 1, the heartbeat vector 1030 includes a set of timestamps <64.52, 76.92, 100.39, 101.23>. If the heartbeat vector 1030 is a vector type 2, the heartbeat vector 1030 includes a set of timestamps <64.52, 101.23>. If the heartbeat vector 1030 is a vector type 3, the heartbeat vector 1030 includes a set of timestamps <64.52, 76.92>, <100.39, 101.23>.

An IDS 1038 may retrieve and analyze the heartbeat vector 1030 to detect any time anomalies that may be indicative of a desynchronization attack that may lead to a desynchronization event for the TSN 618. A security monitory 1036 of the IDS 1038 would compare timestamps from the heartbeat vector 1030 and compare actual time differences against expected time differences. The security monitor 1036 implements a machine learning classifier trained on training data gathered while the TSN 618 operates in the benign operating environment 1000a to obtain expected time differences.

Since the benign operating environment 1000a is not under a desynchronization attack, a machine learning classifier implemented for the security monitor 1036 of the IDS 1038 would analyze the heartbeat vector 1030 of vector type 1, vector type 2 or vector type 3 and perform inferencing operations to classify the actual time intervals between a pair of sequential timestamps as benign or within expected time intervals. Assume a set of expected time differences for transmit hardware times are obtained for the talker node 1002 under benign operating conditions for the TSN 618 as shown in Table 1.

TABLE 1

| | |
|---|---|
| count | 100000.000000 |
| mean | 64.521284 |
| std | 1.255051 |
| min | 63.233000 |
| 25% | 63.610000 |
| 50% | 63.968000 |
| 75% | 65.480000 |
| max | 81.775000 |

Assume a set of expected time differences for receive hardware times are obtained for the listener node 1006 under benign operating conditions for the TSN 618 as shown in Table 2.

TABLE 2

| | |
|---|---|
| count | 100000.000000 |
| mean | 101.189255 |
| std | 0.183115 |
| min | 101.002000 |
| 25% | 101.166000 |
| 50% | 101.187000 |
| 75% | 101.207000 |
| max | 101.207000 |

Given the mean values in TABLE 1 and TABLE 2, the monitor 1036 calculates an expected time difference between transmit of the heartbeat message 1010 from the talker node 1002 to the receipt of the heartbeat message 1010 by the listener node 1006 as 101.189255 µs-64.521284 µs=36.67 µs. If the heartbeat vector 1030 is a vector type 2, the heartbeat vector 1030 includes a set of timestamps <64.52, 101.23>. The security monitor 1036 calculates an actual time difference as 101.23 µs-64.52 µs=36.71 µs. The security monitor 1036 compares the actual time difference of 36.71 µs to the expected time difference of 36.67 µs to find a difference of 36.71 µs-36.67 µs=0.04 µs. Assume the security monitor 1036 has a defined threshold value set to 0.05 µs as evidence of a desynchronization attack. The security monitor 1036 compares the difference of 0.04 µs to the defined threshold value of 0.05 µs and determines that difference is less than the defined threshold value (0.04 µs<0.05 µs). In this example, the security monitor 1036 classifies the time difference as benign or within normal operating parameters.

Figure 10B:
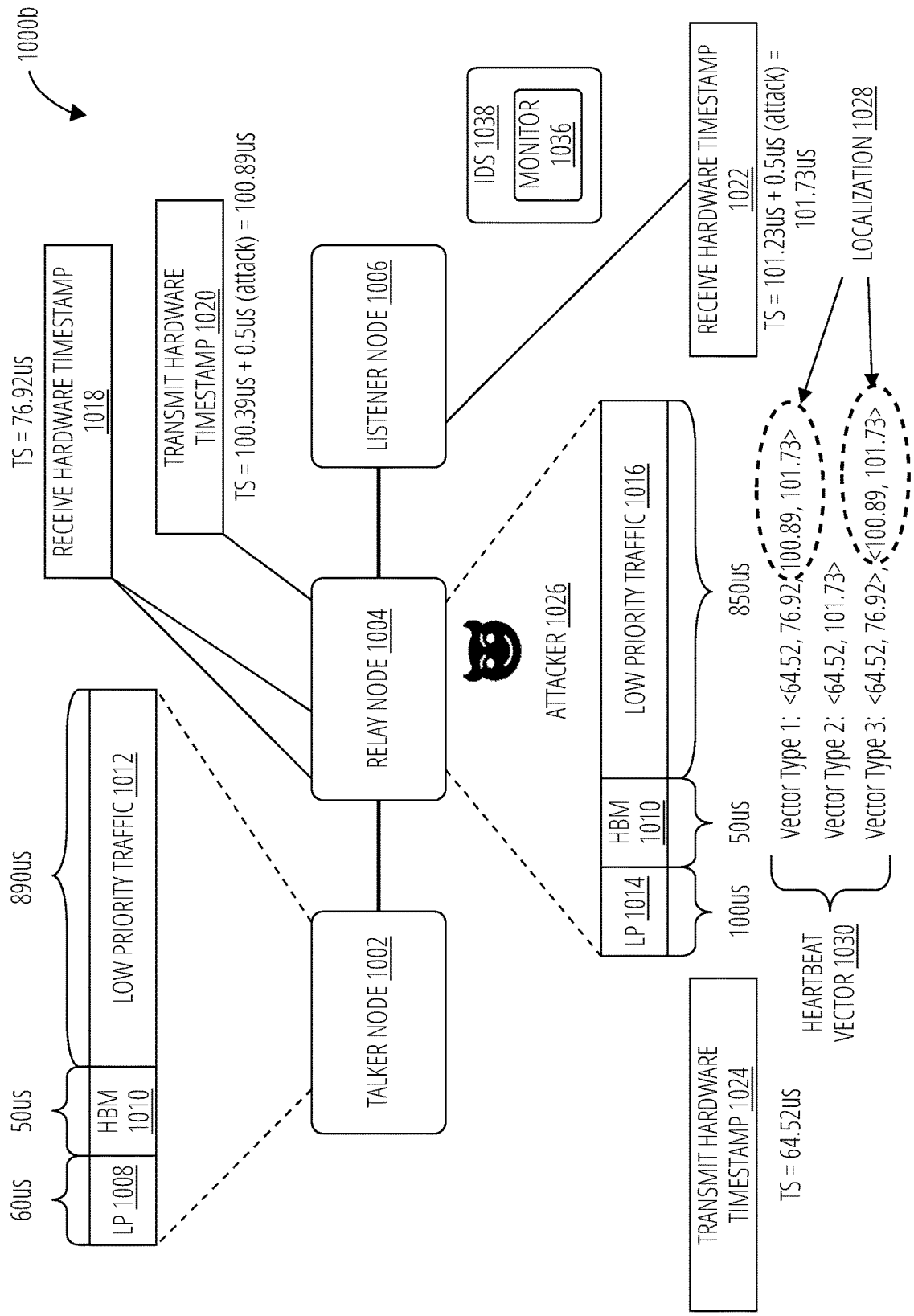
FIG. 10B illustrates an aspect of an attack operating environment 1000b in accordance with one embodiment.

FIG. 10B illustrates an attack operating environment 1000b for the TSN 618. The attack operating environment 1000b illustrates a case where an attacker 1026 launches a desynchronization attack against the relay node 1004. The desynchronization attack adds 0.5 µs to the transmit hardware timestamp 1020 and the receive hardware timestamps 1022. As a result, if the heartbeat vector 1030 is a vector type 1, the heartbeat vector 1030 includes a set of timestamps <64.52, 76.92, 100.89, 101.73>. If the heartbeat vector 1030 is a vector type 2, the heartbeat vector 1030 includes a set of timestamps <64.52, 101.73>. If the heartbeat vector 1030 is a vector type 3, the heartbeat vector 1030 includes a set of timestamps <64.52, 76.92>, <100.89, 101.73>.

Since the attack operating environment 1000b is under a desynchronization attack, a machine learning classifier implemented for a security monitor of an IDS would analyze the heartbeat vector 1030 of vector type 1, vector type 2 or vector type 3 and classify the actual time intervals between a pair of sequential timestamps as malicious or outside expected time intervals by a threshold amount. Starting with a first position in the set of timestamps carried by the heartbeat vector 1030, the pair of timestamps may comprise two timestamps in sequence within the set of timestamps without reuse of either timestamp.

Given the mean values in TABLE 1 and TABLE 2, the monitor 1036 calculates an expected time difference between transmit of the heartbeat message 1010 from the talker node 1002 to the receipt of the heartbeat message 1010 by the listener node 1006 as 101.189255 µs-64.521284 µs=36.67 µs. If the heartbeat vector 1030 is a vector type 2, the heartbeat vector 1030 now includes a set of timestamps <64.52, 101.73> since the desynchronization attack has added 0.05 µs of latency to the heartbeat message 1010, which is captured by the receive hardware timestamp 1022. The security monitor 1036 calculates an actual time difference as 101.73 µs-64.52 µs=37.21 µs. The security monitor 1036 compares the actual time difference of 37.21 µs to the expected time difference of 36.67 µs to find a difference of 37.21 µs-36.67 µs=0.54 µs. Assume the security monitor 1036 has a defined threshold value set to 0.05 µs as evidence of a desynchronization attack. The security monitor 1036 compares the difference of 0.54 μs to the defined threshold value of 0.05 μs and determines that difference is greater than or more than the defined threshold value (0.54 μs>0.05 μs). In this example, the security monitor 1036 classifies the time difference as malicious or outside of normal operating parameters. The security monitor 1036 would generate a security alert and take corrective security actions per a security policy for the TSN 618.

The security monitor 1036 detects a desynchronization attack and it can also quantify an amount of delay introduced by the desynchronization attack, as indicated in the previous example. In addition, the security monitor 1036 can also use localization 1028 to localize the desynchronization attack. For example, if the heartbeat vector 1030 is a vector type 1, the heartbeat vector 1030 includes a set of timestamps <64.52, 76.92, 100.39, 101.23> under benign operating conditions. The desynchronization attack on relay node 1004 produces a different set of timestamps <64.52, 76.92, 100.89, 101.73>. The security monitor 1036 compares the two different sets of timestamps and notes that the timestamps <64.52, 76.92> for the link between the talker node 1002 and the relay node 1004 are within normal operating parameters while timestamps <100.89, 101.73> for the link between the relay node 1004 and the listener node 1006 fall outside of normal operating parameters. The security monitor 1036 localizes the desynchronization attack to the relay node 1004 based on this information. In some embodiments, the security monitor 1036 may have sufficient sensitivity to detect desynchronization attacks on the order of tens of microseconds of 802.1AS drift. Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 11:
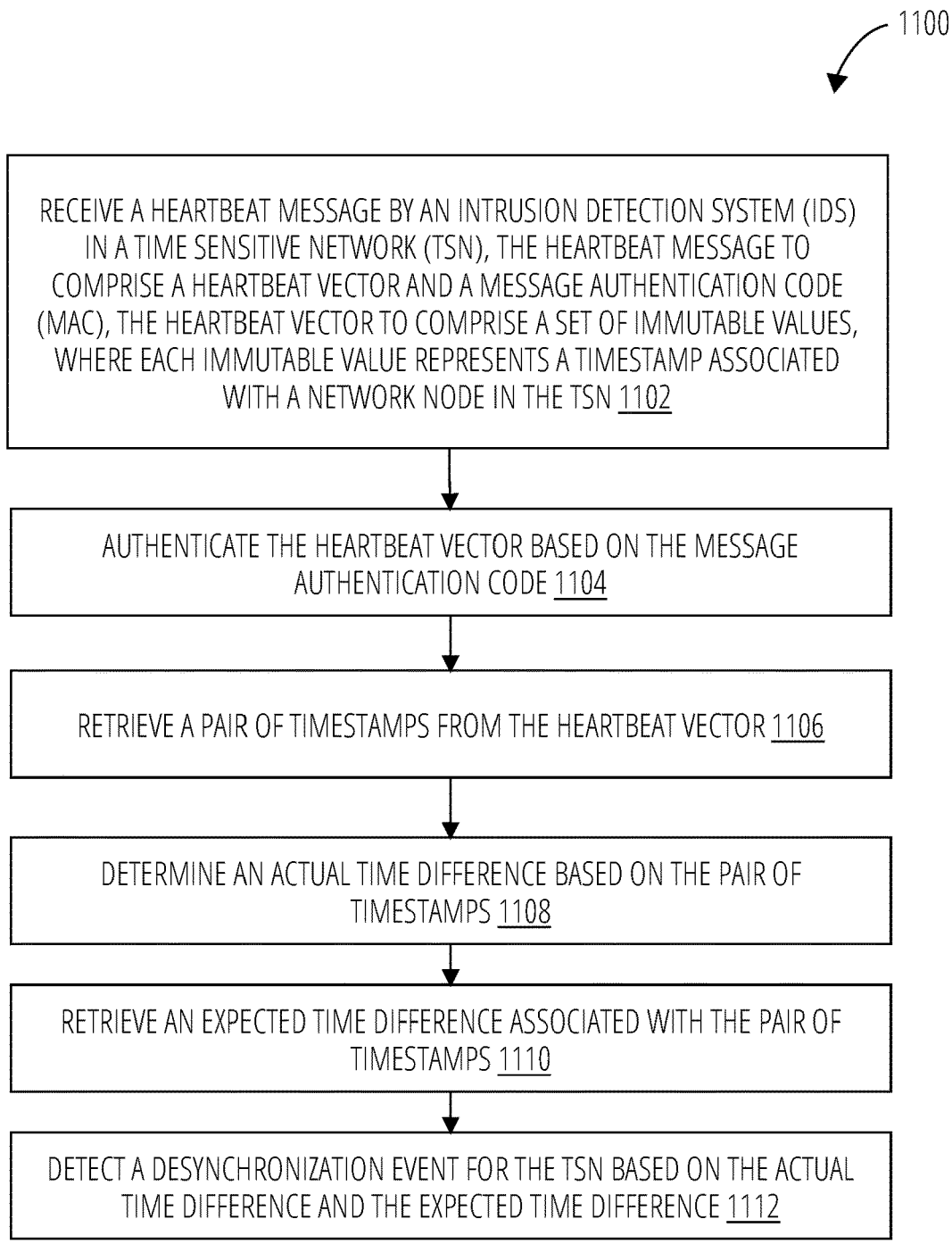
FIG. 11 illustrates an aspect of a logic flow 1100 in accordance with one embodiment.

FIG. 11 illustrates an embodiment of a logic flow 1100. The logic flow 1100 may be representative of some or all of the operations executed by one or more embodiments described herein. For example, the logic flow 1100 may include some or all of the operations performed by devices or entities within the TSNs 102, 200, 300, 618, the TSN node 104, the IDS 110, the apparatus 400, the apparatus 500, and/or the system 800 and system 900. More particularly, the logic flow 1100 illustrates an example where a listener node 806 receives a data stream 830 transporting diagnostic information in the form of time information for one or more TSN nodes 104, and analyzes the diagnostic information to determine whether the one or more TSN nodes 104 are under a security attack based on the analysis.

The logic flow 1100 includes a block 1102 with an operation of receiving a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN. The logic flow 1100 includes a block 1104 with an operation of authenticating the heartbeat vector based on the message authentication code. The logic flow 1100 includes a block 1106 with an operation of retrieving a pair of timestamps from the heartbeat vector. The logic flow 1100 includes a block 1108 with an operation of determining an actual time difference based on the pair of timestamps. The logic flow 1100 includes a block 1110 with an operation of retrieving an expected time difference associated with the pair of timestamps, and detecting a desynchronization event for the TSN based on the actual time difference and the expected time difference.

By way of example, the monitor 1036 of the IDS 1038 receives a heartbeat message 1010 in the TSN 618. The heartbeat message 1010 comprises a heartbeat vector 1030 and a MAC 712. The heartbeat vector 1030 comprises a set of immutable values, where each immutable value represents a timestamp associated with a network node in the TSN 618, such as the transmit hardware timestamp 1024, the receive hardware timestamp 1018, the transmit hardware timestamp 1020, the receive hardware timestamp 1022. The IDS 1038 includes a cryptographic engine 816 to authenticate the heartbeat vector 1030 based on the MAC 712. The monitor 1036, retrieves a pair of timestamps from the heartbeat vector 1030, such as <64.52, 101.73>. The monitor 1036 determines an actual time difference based on the pair of timestamps, such as 101.73 μs-64.52 μs=37.21 μs. The monitor 1036 retrieves an expected time difference associated with the pair of timestamps, such as 101.189255 μs-64.521284 μs=360.67 μs. The monitor 1036 detects a desynchronization event for the TSN based on the actual time difference and the expected time difference. The security monitor 1036 compares the actual time difference of 370.21 μs to the expected time difference of 36.67 μs to find a difference of 370.21 μs-36.67 μs=0.54 μs. Assume the security monitor 1036 has a defined threshold value set to 0.05 μs as evidence of a desynchronization attack. The security monitor 1036 compares the difference of 0.54 μs to the defined threshold value of 0.05 μs and determines that difference is more than the defined threshold value (0.54 μs>0.05 μs). In this example, the security monitor 1036 classifies the time difference as malicious or outside of normal operating parameters. The security monitor 1036 would generate a security alert and take corrective security actions per a security policy for the TSN 618.

The logic flow 1100 may include further operations as well. By way of example and not limitation, the logic flow 1100 of any previous example, may further include receiving the heartbeat message by the IDS at a defined time interval at a frequency that is more than a synchronization interval for network nodes in the TSN. The logic flow 1100 of any previous example, may further include receiving the heartbeat message with an identifier to identify a priority level for the heartbeat message, the priority level to indicate a highest priority level for transport through the TSN. The logic flow 1100 of any previous example, may further include detecting the desynchronization event for the network node using a machine learning model. The logic flow 1100 of any previous example, may further include determining a desynchronization time interval between the actual time difference and the expected time difference, receiving the desynchronization time interval as input for a machine learning classifier, classifying the desynchronization time interval as indicative of the desynchronization event by the machine learning classifier. The logic flow 1100 of any previous example, may further include detecting the desynchronization event for the TSN when a desynchronization time interval between the actual time difference and the expected time difference is greater than 12.5 microseconds. The logic flow 1100 of any previous example, may further include where each timestamp represents a timestamp associated with a transmitter hardware, a transmitter wakeup, a transmitter program, a transmitter kernel network scheduler, a transmitter kernel hardware, a receiver hardware, a receiver program, or any other timestamp associated with an event when a talker/listener exchange a heartbeat. It may be appreciated that there are other timestamps that are associated with handling the send/received timestamps and embodiments are not limited to these examples. There could also be, for instance, a timestamp associated with moving the receiver timestamp from network card to receiver kernel. Embodiments are not limited in this context.

The logic flow 1100 of any previous example, may further include where the pair of timestamps comprise a first timestamp and a second timestamp, the first timestamp to indicate a transmit time for a first network node, and the second timestamp to indicate a receive time for a second network node. The logic flow 1100 of any previous example, may further include localizing the desynchronization event to a network node in the TSN based on a position for each of the pair of timestamps in the set of immutable values. The logic flow 1100 of any previous example, may further include generating a security alert or security action in response to detection of the desynchronization event.

Figure 12:
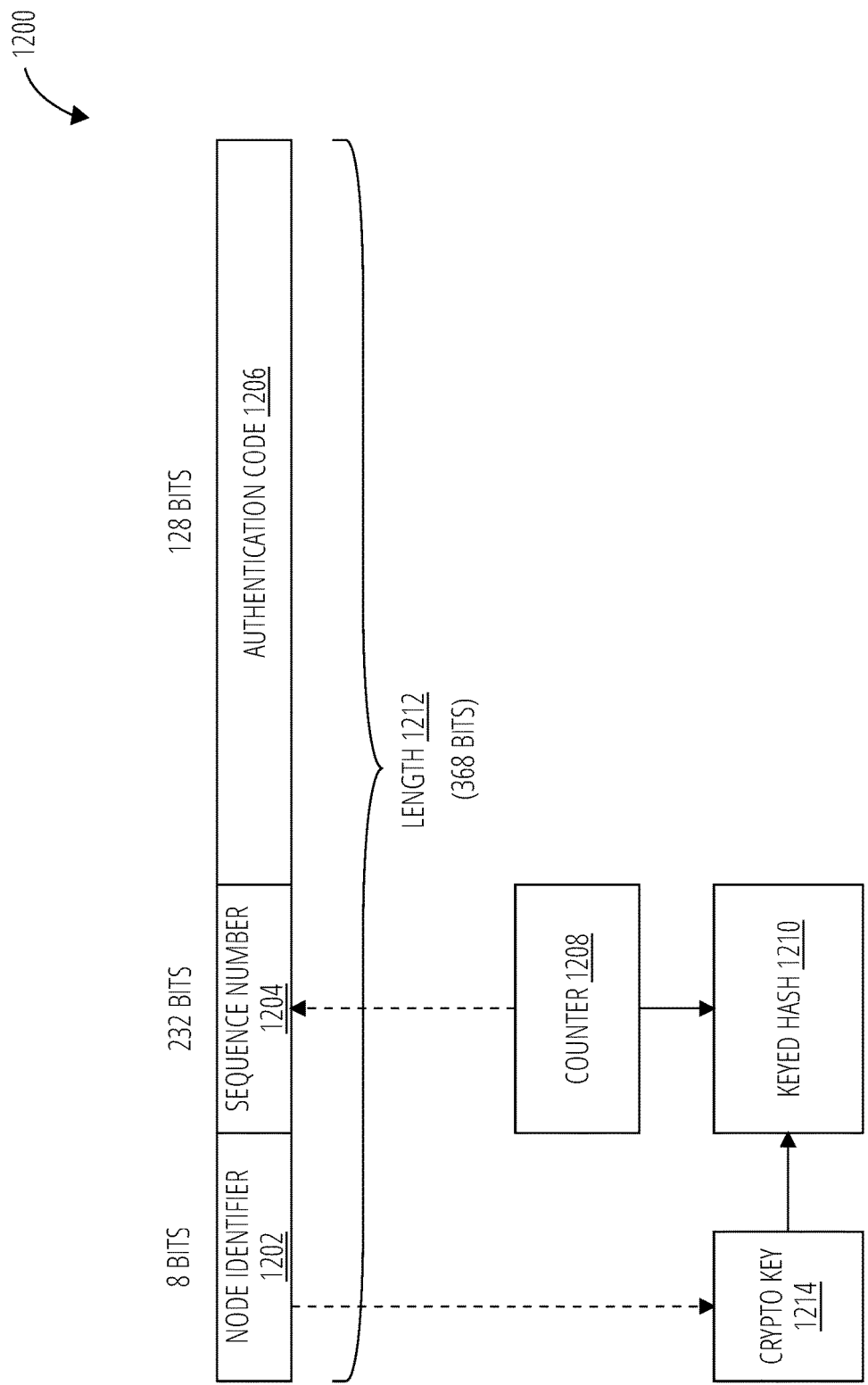
FIG. 12 illustrates an aspect of heartbeat message structure 1200 in accordance with one embodiment.

FIG. 12 illustrates an exemplary heartbeat message structure 1200 suitable for the heartbeat messages as described herein, such as heartbeat message 1010, for example. As depicted in FIG. 12, the heartbeat message structure 1200 has three information fields. The first information field is for a node identifier 1202 and it comprises a length of 8 bits. The second information field is for a sequence number 1204 and it comprises a length of 232 bits. The third information field is for an authentication code 1206 (e.g., MAC 712) and it has a length of 128 bits. The three information fields have a combined total length of 368 bits. It may be appreciated that the number of fields and length of each field is given by way of example and not limitation, and a different number of fields and field lengths can be used for a given implementation. Embodiments are not limited in this context.

Each heartbeat message 1010 is generated to be unique, bounded to a TSN node 104, and unforgeable using a cryptographic algorithm. In one embodiment, for example, a pair-wise crypto key 1214 is shared between a TSN node 104 and a security monitor, such as monitor 812. The crypto key 1214 is used as a first input to a key hash algorithm. A count value from a counter 1208 is used as a second input to the key hash algorithm. The key hash algorithm receives the two inputs and outputs a keyed hash 1210. The keyed hash 1210 binds the node identifier 1202 for a TSN node 104 and a Sequence number 1204. A monitor 812 can use the keyed hash 1210 to authenticate and verify each heartbeat message 1010.

Some embodiments can avoid exhausting a count value of heartbeat message numbers by changing the cryptographic key on a periodic, aperiodic or on-demand basis. This prevents a condition where a TSN node 104 or TSN 102 runs out of sequence numbers. Cryptographic keys are changed periodically, following well-known specifications, such as those from the National Institute of Standards and Technology (NIST). Re-keying operations may also be triggered when a system is potentially running out of sequence numbers.

Embodiments are specifically-designed to protect a TSN 102 from an attacker 1026 attempting to compromise one or more TSN nodes 104 from multiple attack vectors. For instance, assume the attacker 1026 attempts to inject new packets into the TSN 618. In this case, the attacker 1026 cannot forge heartbeat message 1010 as any forged heartbeat message will be detected via the cryptograph scheme used by the TSN nodes 104 and the monitor 812.

FIG. 13A depicts a device 1316. The device 1316 could be any one of the TSN nodes 104 in a TSN network. Device 1316 includes a processing circuit 1302, a clock 1304, memory 1306, radio circuitry 1308, an antenna 1310, a network interface circuitry 1318, and a wired connection 1320. Memory 1306 stores instructions 1312 and heartbeat instructions 1314. During operation, processing circuit 1302 can execute instructions 1312 and/or heartbeat instructions 1314 to cause device 1316 to originate, consume, analyze and monitor data streams 830 carrying heartbeat message 1010 from other devices in the TSN network. In some examples, processing circuit 1302 can execute instructions 1312 and/or heartbeat instructions 1314 to cause device 1316 to operate as a clock leader (CL) for the TSN network, such as sending time synchronization messages, time update messages, and other timing messages defined by various IEEE standards as discussed herein. Furthermore, processing circuit 1302 can execute instructions 1312 to cause device 1316 to send, via radio circuitry 1308 and antenna 1310 or network interface circuitry 1318 timing messages as the CL for a CF in a TSN network. In addition, processing circuit 1302 can execute instructions 1312 to cause device 1316 to send, via radio circuitry 1308 and antenna 1310 or network interface circuitry 1318 heartbeat messages and/or security messages in response to a security attack, such as alert messages, notification messages, network reconfiguration messages, device isolation messages, model update messages, and other messages in a TSN network.

FIG. 13B depicts a device 1336. The device 1336 could be any one of the TSN nodes 104 in a TSN network. Device 1336 includes a processing circuit 1322, a clock 1324, memory 1326, radio circuitry 1328, an antenna 1330, a network interface circuitry 1338, and a wired connection 1340. Memory 1326 stores instructions 1332 and heartbeat instructions 1334. During operation, processing circuit 1322 can execute instructions 1332 and/or heartbeat instructions 1334 to cause device 1336 to originate, consume, analyze and monitor data streams 830 carrying heartbeat message 1010 to other devices in the TSN network. In some examples, processing circuit 1322 can execute instructions 1332 and/or heartbeat instructions 1334 to operate as a clock follower (CF) for the TSN network, such as receiving timing messages as a clock follower (e.g., from time measurements from a global clock for a TSN network) from other devices in the TSN network, such as the device 1316. In some examples, processing circuit 1322 can execute instructions 1332 and/or heartbeat instructions 1334 to cause device 1336 to receive time synchronization messages, time update messages, and other timing messages defined by various IEEE standards as discussed herein. Furthermore, processing circuit 1322 can execute instructions 1332 and/or heartbeat instructions 1334 to cause device 1336 to receive, via radio circuitry 1328 and antenna 1330 or network interface circuitry 1338 timing messages as the CF for a CL in a TSN network. In addition, processing circuit 1322 can execute instructions 1332 and/or heartbeat instructions 1334 to cause device 1336 to send, via radio circuitry 1328 and antenna 1330 or network interface circuitry 1338 heartbeat messages and security messages in response to a security attack, such as alert messages, notification messages, network reconfiguration messages, device isolation messages, model update messages, and other messages in a TSN network.

Figure 14:
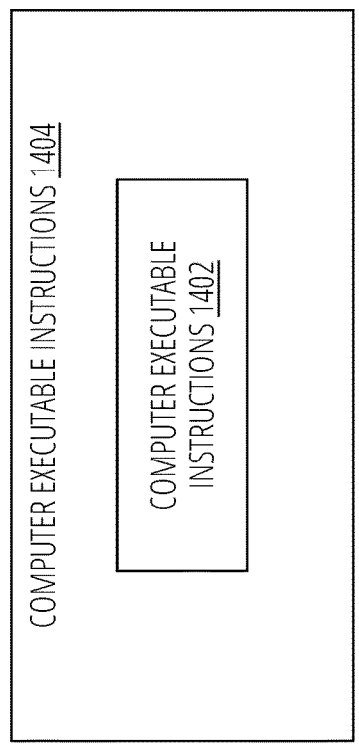
FIG. 14 illustrates an aspect of a computer-readable medium 1400 in accordance with one embodiment.

FIG. 14 illustrates computer-readable storage computer-readable medium 1400. Computer-readable storage computer-readable medium 1400 may comprise any non-transitory computer-readable storage medium or machine-readable storage medium, such as an optical, magnetic or semiconductor storage medium. In various embodiments, computer-readable storage computer-readable medium 1400 may comprise an article of manufacture. In some embodiments, computer-readable storage computer-readable medium 1400 may store computer executable instructions 1402 with which circuitry (e.g., processing circuitry 414, processor circuitry 818, processor circuitry 824, processing circuit 1302, processing circuit 1322, radio circuitry 1308, radio circuitry 1328, network interface circuitry 1318, network interface circuitry 1338, clock manager 106, clock circuitry 412, interface 822, interface 828, or the like) can execute. For example, computer executable instructions 1402 can include instructions to implement operations described with respect to logic flows 1900 and 2000. Examples of computer-readable storage computer-readable medium 1400 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1402 may include any suitable type of code, such as source code, compiled code, interpreted code, executable code, static code, dynamic code, object-oriented code, visual code, and the like.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

In one example, a method, may include receiving a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN, authenticating the heartbeat vector based on the message authentication code, retrieving a pair of timestamps from the heartbeat vector, determining an actual time difference based on the pair of timestamps, retrieving an expected time difference associated with the pair of timestamps, and detecting a desynchronization event for the TSN based on the actual time difference and the expected time difference.

The method of any previous example may include receiving the heartbeat message by the IDS at a defined time interval that is less than a synchronization interval for network nodes in the TSN.

The method of any previous example may include receiving the heartbeat message with an identifier to identify a priority level for the heartbeat message, the priority level to indicate a highest priority level for transport through the TSN.

The method of any previous example may include detecting the desynchronization event for the network node using a machine learning model.

The method of any previous example may include determining a desynchronization time interval between the actual time difference and the expected time difference, receiving the desynchronization time interval as input for a machine learning classifier, classifying the desynchronization time interval as indicative of the desynchronization event by the machine learning classifier.

The method of any previous example may include detecting the desynchronization event for the TSN when a desynchronization time interval between the actual time difference and the expected time difference is greater than 12.5 microseconds.

The method of any previous example may also include where each timestamp represents a timestamp associated with a transmitter hardware, a transmitter wakeup, a transmitter program, a transmitter kernel network scheduler, a transmitter kernel hardware, a receiver hardware, or a receiver program.

The method of any previous example may also include where the pair of timestamps comprise a first timestamp and a second timestamp, the first timestamp to indicate a transmit time for a first network node, and the second timestamp to indicate a receive time for a second network node.

The method of any previous example may include localizing the desynchronization event to a network node in the TSN based on a position for each of the pair of timestamps in the set of immutable values.

The method of any previous example may include generating a security alert or security action in response to detection of the desynchronization event.

In one example, a computing apparatus may include a processing circuitry. The computing apparatus may include a memory storing instructions that, when executed by the processing circuitry, cause the processing circuitry to receive a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN, authenticate the heartbeat vector based on the message authentication code, retrieve a pair of timestamps from the heartbeat vector, determine an actual time difference based on the pair of timestamps, retrieve an expected time difference associated with the pair of timestamps, and detect a desynchronization event for the TSN based on the actual time difference and the expected time difference.

The computing apparatus of any previous example, the processing circuitry to receive the heartbeat message by the IDS at a defined time interval that is less than a synchronization interval for network nodes in the TSN.

The computing apparatus of any previous example, the processing circuitry to receive the heartbeat message with an identifier to identify a priority level for the heartbeat message, the priority level to indicate a highest priority level for transport through the TSN.

The computing apparatus of any previous example, the processing circuitry to detect the desynchronization event for the network node using a machine learning model.

The computing apparatus of any previous example, the processing circuitry to determine a desynchronization time interval between the actual time difference and the expected time difference, receive the desynchronization time interval as input for a machine learning classifier, classify the desynchronization time interval as indicative of the desynchronization event by the machine learning classifier.

The computing apparatus of any previous example, the processing circuitry to detect the desynchronization event for the TSN when a desynchronization time interval between the actual time difference and the expected time difference is greater than 12.5 microseconds.

The computing apparatus of any previous example may also include where each timestamp represents a timestamp associated with a transmitter hardware, a transmitter wakeup, a transmitter program, a transmitter kernel network scheduler, a transmitter kernel hardware, a receiver hardware, or a receiver program.

The computing apparatus of any previous example may also include where the pair of timestamps comprise a first timestamp and a second timestamp, the first timestamp to indicate a transmit time for a first network node, and the second timestamp to indicate a receive time for a second network node.

The computing apparatus of any previous example, the processing circuitry to localize the desynchronization event to a network node in the TSN based on a position for each of the pair of timestamps in the set of immutable values.

The computing apparatus of any previous example, the processing circuitry to generate a security alert or security action in response to detection of the desynchronization event. Other technical features may be readily apparent to one skilled in the art from the following figures, descriptions, and claims.

In one example, a non-transitory computer-readable storage medium, the computer-readable storage medium including instructions that when executed by a computer, cause the computer to receive a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN, authenticate the heartbeat vector based on the message authentication code, retrieve a pair of timestamps from the heartbeat vector, determine an actual time difference based on the pair of timestamps, retrieve an expected time difference associated with the pair of timestamps, and detect a desynchronization event for the TSN based on the actual time difference and the expected time difference.

The computer-readable storage medium of any previous example may include instructions to receive the heartbeat message by the IDS at a defined time interval that is less than a synchronization interval for network nodes in the TSN.

The computer-readable storage medium of any previous example may include instructions to receive the heartbeat message with an identifier to identify a priority level for the heartbeat message, the priority level to indicate a highest priority level for transport through the TSN.

The computer-readable storage medium of any previous example may include instructions to detect the desynchronization event for the network node using a machine learning model.

The computer-readable storage medium of any previous example may include instructions to determine a desynchronization time interval between the actual time difference and the expected time difference, receive the desynchronization time interval as input for a machine learning classifier, classify the desynchronization time interval as indicative of the desynchronization event by the machine learning classifier.

The computer-readable storage medium of any previous example may include instructions to detect the desynchronization event for the TSN when a desynchronization time interval between the actual time difference and the expected time difference is greater than 12.5 microseconds.

The computer-readable storage medium of any previous example may also include where each timestamp represents a timestamp associated with a transmitter hardware, a transmitter wakeup, a transmitter program, a transmitter kernel network scheduler, a transmitter kernel hardware, a receiver hardware, or a receiver program.

The computer-readable storage medium of any previous example may also include where the pair of timestamps comprise a first timestamp and a second timestamp, the first timestamp to indicate a transmit time for a first network node, and the second timestamp to indicate a receive time for a second network node.

The computer-readable storage medium of any previous example may include instructions to localize the desynchronization event to a network node in the TSN based on a position for each of the pair of timestamps in the set of immutable values.

The computer-readable storage medium of any previous example may include instructions to generate a security alert or security action in response to detection of the desynchronization event.

It may be appreciated that any of the previous examples may be implemented as systems and/or means plus function embodiments. Embodiments are not limited to these examples.

What is claimed is:

1. A method, comprising:
    receiving a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN;
    authenticating the heartbeat vector based on the message authentication code;
    retrieving a pair of timestamps from the heartbeat vector;
    determining an actual time difference based on the pair of timestamps;
    retrieving an expected time difference associated with the pair of timestamps; and
    detecting a desynchronization event for the TSN based on the actual time difference and the expected time difference using a machine learning model.

2. The method of claim 1, comprising receiving the heartbeat message by the IDS at a defined time interval that is more than a synchronization interval for network nodes in the TSN.

3. The method of claim 1, comprising receiving the heartbeat message with an identifier to identify a priority level for the heartbeat message, the priority level to indicate a highest priority level for transport through the TSN.

4. The method of claim 1, comprising:
    determining a desynchronization time interval between the actual time difference and the expected time difference;
    receiving the desynchronization time interval as input for a machine learning classifier; and
    classifying the desynchronization time interval as indicative of the desynchronization event by the machine learning classifier.

5. The method of claim 1, wherein each timestamp represents a timestamp associated with a transmitter hardware, a transmitter wakeup, a transmitter program, a transmitter kernel network scheduler, a transmitter kernel hardware, a receiver hardware, or a receiver program.

6. The method of claim 1, comprising generating a security alert or security action in response to detection of the desynchronization event.

7. A computing apparatus comprising:
    a processing circuitry; and
    a memory storing instructions that, when executed by the processing circuitry, cause the processing circuitry to:
    receive a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN;
    authenticate the heartbeat vector based on the message authentication code;
    retrieve a pair of timestamps from the heartbeat vector;
    determine an actual time difference based on the pair of timestamps;
    retrieve an expected time difference associated with the pair of timestamps; and
    detect a desynchronization event for the TSN based on the actual time difference and the expected time difference using a machine learning model.

8. The computing apparatus of claim 7, the processing circuitry to receive the heartbeat message by the IDS at a defined time interval that is more than a synchronization interval for network nodes in the TSN.

9. The computing apparatus of claim 7, the processing circuitry to receive the heartbeat message with an identifier to identify a priority level for the heartbeat message, the priority level to indicate a highest priority level for transport through the TSN.

10. The computing apparatus of claim 7, the processing circuitry to:
    determine a desynchronization time interval between the actual time difference and the expected time difference;
    receive the desynchronization time interval as input for a machine learning classifier; and
    classify the desynchronization time interval as indicative of the desynchronization event by the machine learning classifier.

11. A non-transitory computer-readable storage medium, the computer-readable storage medium including instructions that when executed by a computer, cause the computer to:
    receive a heartbeat message by an intrusion detection system (IDS) in a time sensitive network (TSN), the heartbeat message to comprise a heartbeat vector and a message authentication code (MAC), the heartbeat vector to comprise a set of immutable values, where each immutable value represents a timestamp associated with a network node in the TSN;
authenticate the heartbeat vector based on the message authentication code;
retrieve a pair of timestamps from the heartbeat vector;
determine an actual time difference based on the pair of timestamps;
retrieve an expected time difference associated with the pair of timestamps; and
detect a desynchronization event for the TSN based on the actual time difference and the expected time difference using a machine learning model.

12. The computer-readable storage medium of claim 11, comprising instructions to receive the heartbeat message by the IDS at a defined time interval that is more than a synchronization interval for network nodes in the TSN.

13. The computer-readable storage medium of claim 11, comprising instructions to receive the heartbeat message with an identifier to identify a priority level for the heartbeat message, the priority level to indicate a highest priority level for transport through the TSN.

14. The computer-readable storage medium of claim 11, comprising instructions to:
determine a desynchronization time interval between the actual time difference and the expected time difference;
receive the desynchronization time interval as input for a machine learning classifier; and
classify the desynchronization time interval as indicative of the desynchronization event by the machine learning classifier.

* * * * *